US009540235B2

(12) United States Patent (10) Patent No.: US 9,540,235 B2
Sureshkumar et al. (45) Date of Patent: Jan. 10, 2017

(54) NANOPARTICLE ARRAY COMPRISING DISTRIBUTED NANOPARTICLES

(75) Inventors: Radhakrishna Sureshkumar, Syracuse, NY (US); Tao Cong, Syracuse, NY (US); Satvik Wani, Syracuse, NY (US)

(73) Assignee: SYRACUSE UNIVERSITY, Syracuse, NY (US)

( * ) Notice: Subject to any disclaimer, the term of this patent is extended or adjusted under 35 U.S.C. 154(b) by 969 days.

(21) Appl. No.: 13/422,741

(22) Filed: Mar. 16, 2012

(65) Prior Publication Data

US 2012/0292579 A1 Nov. 22, 2012

Related U.S. Application Data

(60) Provisional application No. 61/454,392, filed on Mar. 18, 2011.

(51) Int. Cl.
*B82Y 30/00* (2011.01)
*B01J 13/00* (2006.01)
*B82Y 40/00* (2011.01)

(52) U.S. Cl.
CPC .............. *B82Y 30/00* (2013.01); *B01J 13/006* (2013.01); *B01J 13/0052* (2013.01);
(Continued)

(58) Field of Classification Search
CPC ... B01J 13/0056; B01J 13/0052; B01J 13/006; B01J 13/0065; B01J 13/0069; B82Y 30/00; B82Y 40/00
See application file for complete search history.

(56) References Cited

U.S. PATENT DOCUMENTS

2007/0161754 A1* 7/2007 Wang ..................... B82Y 30/00
525/242
2008/0153720 A1* 6/2008 Huang et al. ................. 507/271
(Continued)

FOREIGN PATENT DOCUMENTS

WO WO 2007/123846 A2 11/2007
WO WO 2010070679 A2 6/2010

OTHER PUBLICATIONS

Kannaiyan, Dinkaran et al "On the synergistic coupling properties of composite CdS/TiO2 nanoparticle array confined in nanopatterned hydrid thin films",2010, J. Mater. Chem., 20, 677-682.*
(Continued)

*Primary Examiner* — Ling Choi
*Assistant Examiner* — David L Miller
(74) *Attorney, Agent, or Firm* — Heslin Rothenberg Farley & Mesiti P.C.

(57) ABSTRACT

There is set forth herein a method for providing a nanoparticle array. A nanoparticle network can be provided by nanoparticles combined with surfactant micelle chains. The nanoparticle network can be provided by distributing metal nanoparticles in a surfactant solution and agitating the surfactant solution comprising the nanoparticles to form a gel comprising the nanoparticle network which can be characterized by a distributed array of nanoparticles combined with surfactant micelle chains within a fluid. The gel can comprise a fluid in a continuous phase and the nanoparticles in a discontinuous phase. Apparatus having arrays of nanoparticles are also set forth herein.

32 Claims, 32 Drawing Sheets

(52) U.S. Cl.
CPC ....... *B01J 13/0056* (2013.01); *B01J 13/0065* (2013.01); *B01J 13/0069* (2013.01); *B82Y 40/00* (2013.01)

(56) References Cited

U.S. PATENT DOCUMENTS

2009/0108235 A1* 4/2009 Ando et al. ............ 252/301.6 S
2010/0264364 A1* 10/2010 Wagner et al. .......... 252/182.12

OTHER PUBLICATIONS

Einstein, Albert, "Eine Neue bestimmung der Molekuldemsionen", Jan. 1906, Annalen der Physik, vol. 324 Issue 2 pp. 289-306.*
Helgeson et al., Formation and Rheology of Viscoelastic "Double Networks" in Wormlike Micelle-Nanoparticle Mixtures, Langmuir, Mar. 17, 2010, vol. 26, Issue 11, pp. 8049-8060. Abstract only.
Wadekar et al., Polymerization in Surfactant Liquid Crystalline Phase, Chem. Mater, 2005, vol. 17, pp. 2460-2465. Abstract only.
Monat et al., Integrated Optofluidics: A New River of Light, Nature Photonics, vol. 1, Feb. 2007, pp. 106-114.
Psaltis et al., Developing Optofluidic Technology Through the Fusion of Microfludics and Optics, Nature Photonics, col. 442, Jul. 27, 2006, pp. 381-386.
Nettesheim et al., Influence of Nanoparticle Addition on the Properties of Wormlike Micellar Solutions, Langmuir 2008, pp. 7718-7726.
Atwater et al., Plasmonics for Improved Photovoltaic Devices, Nature Materials, vol. 9, Feb. 19, 2010, pp. 205-213. Abstract Only.
Pillai et al., Surface Plasmon Enhanced Silicon Solar Cells, J. Appl. Phys., vol. 101, 2007, Abstract only.
Trice et al., In Silico Design of Metal-Dielectric Nanocomposites for Solar Energy Applications, Proc. of SPIE 6648, Jul. 31, 2007, Abstract only.
Hicks et al., Controlling Plasmon Line Shapes Through Diffractive Coupling in Linear Arrays of Cylindrical Nanoparticles Fabricated by Electron Beam Lithography, Nano Letters, 2005, vol. 5, No. 6, pp. 1065-1070.
Campos et al., Highly Versatile and Robust Materials for Soft Imprint Lithography Based on Thiol-ene Click Chemistry, Advanced Materials, Oct. 2, 2008 vol. 20, Issue 19, pp. 3728-3733, Abstract only.
Lanyon et al., Fabrication of Nanopore Array Electrodes by Focused Ion Beam Milling, Anal. Chem, Mar. 20, 2007, pp. 3048-3055, Abstract only.
Wu et al., On the Breakup of Patterned Nanoscale Copper Rings into Droplets via Pulsed-Laser-Induced Dewetting: Competing Liquid-Phase Instability and Transport Mechanics, Langmuir, Apr. 7, 2010, vol. 26, pp. 11972-11979.
Kondic et al., Nanoparticle Assembly Via the Dewetting of Patterned Thin Metal Lines: Understanding the Instability Mechanics, Physical Review, 2009, vol. 79, pp. 026302-1-026302-7.
Favazza et al., Self-Organized Metal Nanostructures Through Laser Driven Thermocapillary Convection, Appl. Phys. Letters, vol. 91, 2007.
Trice et al., Novel Self-Organized Mechanism in Ultrathin Liquid Films: Theory and Experiment, Physical Review Letters, Jul. 4, 2008, pp. 017802-1-017802-4.
Favazza et al., Robust Nanopatterning by Laser-Induced Dewetting of Metal Nanofilms, Nanotechnology, 2006, vol. 17, pp. 4229-4234.
Kuznetsov et al., Nanostructuring of Thin Gold Films by Femtosecond Lasers, Applied Physics, 2009, vol. 94, No. 2, pp. 221-230, Abstract only.
Porter et al., Electroless Nanoparticle Film Deposition Compatible with Photolithography, Microcontact Printing, and Dip-Pen Nanolithography Patterning Technologies, Nano Letters, 2002, vol. 2, No. 12, pp. 1369-1372.
Jean-Francois Berret, Rheology of Wormlike Micelles: Equilibrium Properties and Shear Banding Transition, Springer, 2006, part 6, pp. 667-720.
Jiang Yang, Viscoelastic Wormlike Micelles and Their Applications, Current Opinion in Colloid and Interface Science, 2002, vol. 7, pp. 276-281.
Christopher W. Macosko, Rheology Principles, Measurements and Applications, 1994, Abstract only.
Schubert et al., The Microstructure and Rheology of Mixed Cationic/Anionic Wormlike Micelles, Langmuir, 2003, vol. 19, pp. 4079-4089.
Granek et al., Stress Relaxation in Living Polymers: Results from a Poisson Renewal Model, The Journal of Chemical Physics, 1992, vol. 96, Issue 6, abstract only.
Cates et al., Statics and Dynamics of Worm-Like Surfactant Micelles, J. Phys. 1990, pp. 6869-6892.
Shikata et al., Rheo-Optical Behavior of Wormlike Micelles, Langmuir, 1994, vol. 10, pp. 3470-3476.
Kik et al., Surface Plasmon Nanophotonics, Springer Series Optical Science, 2007, vol. 131, pp. 1-9, Abstract only.
Nov. 1, 2012 International Search Report in International Application No. PCT/US2012/029490.
Taton, Andrew T., Lu, Gang and Mirkin, Chad A., "Two-Color Labeling of Oligonucleotide Arrays via Size-Selective Scattering of Nonoparticle Probes ", *Journal of the American Chemical Society*, May 2001, pp. 5164-5165, vol. 123, Issue 21.
Lin, Jun, Zhou, Weilie and O'Connor, Charles J., "Formation of Order Arrays of Gold Nanoparticles from CTAB Reverse Micelles", *Materials Letter*, North Holland Publishing Company, Jul. 2001, pp. 282-286, vol. 45, Issue 5.
Seip, Candace T., and O'Connor, Charles J., "The Fabrication and Organization of Self-Assembled Metallic Nanoparticles Formed in Reverse Micelles", *Elsevier Science LTD.*, Jan. 1999, pp. 183-186, vol. 12, Issue 1-4.
Helgeson, Matthew E., Hodgson, Travis K., Kaler, Eric W., Wagner, Norman J., Vethamuthu, Martin and Ananthapadmanabhan, K.P., "Formation and Rheology of Viscoelastic "Double Networks" in Wormlaike Micelle—Nanaparticle Mixtures", *Langmuir Article*, Jun. 2010, pp. 8049-8060, vol. 26, Issue 11.
Love, Christine S., Chechik, Victor, Smith, David K., Wilson, Karen, Ashworth, Ian and Brennan, Colin, "Synthesis of Gold Nonparticles Within a Superamolecular Gel-Phase Network", *Chemical Communications*, Jan. 2005, pp. 1971-1973, Issue 15.
Extended European Search Report, dated Nov. 17, 2014, from corresponding European Application No. EP12760852.9, completed on Nov. 17, 2014.
T. Cong, et al., "Plasmonic Nanogels with Robustly Tunable Optical Properties," Proc. SPIE 8097, Optical Trapping Micromanipulation VIII, 80970L, published Sep. 9, 2011.
T. Cong, et al., "Structure and Optical Properties of Self-Assembled Multicomponent Plasmonic Nanogels," Applied Physics Letters, 99 (4), 043112 (3 pp), published Jul. 29, 2011.
Sureshkumar, et al., U.S. Appl. No. 61/454,392, filed Mar. 18, 2011.
International Application Status Report, for International Application No. PCT/US2012/029490, Generated on Oct. 7, 2016.
International Preliminary Report on Patentability, for International Application No. PCT/US2012/029490, dated Sep. 24, 2013.
Written Opinion of the International Searching Authority, for International Application No. PCT/US2012/029490, dated Oct. 31, 2012.
C. Bohren, et al., "Absorption and Scattering of Light by Small Particles," Wiley-VCH GmbH & Co., pp. xi-xiv, published 2004.

* cited by examiner

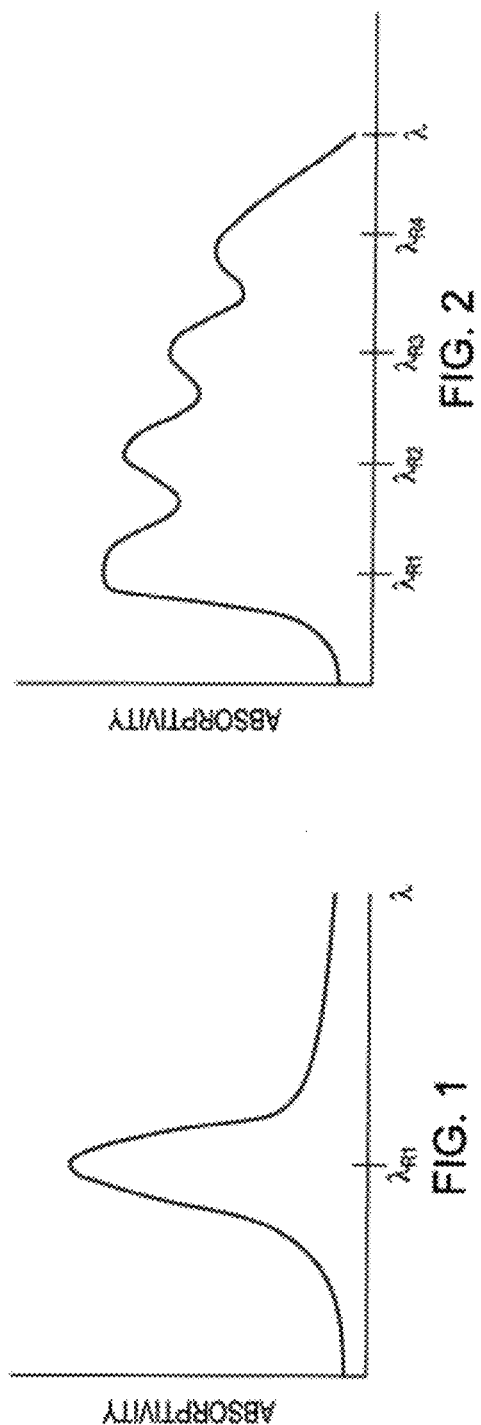
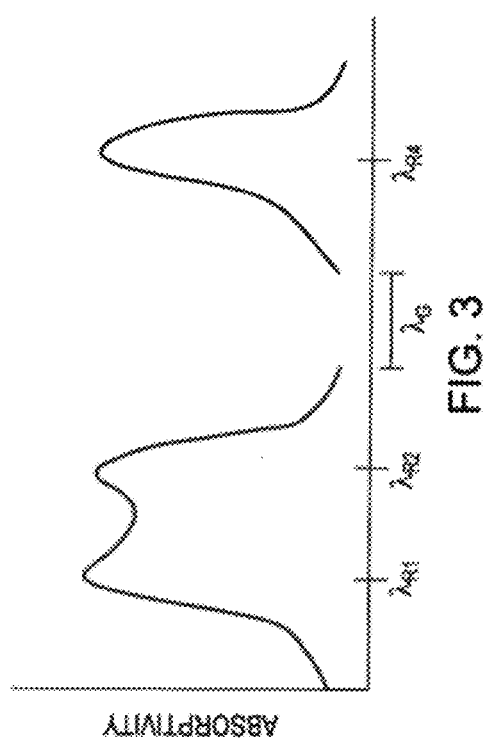

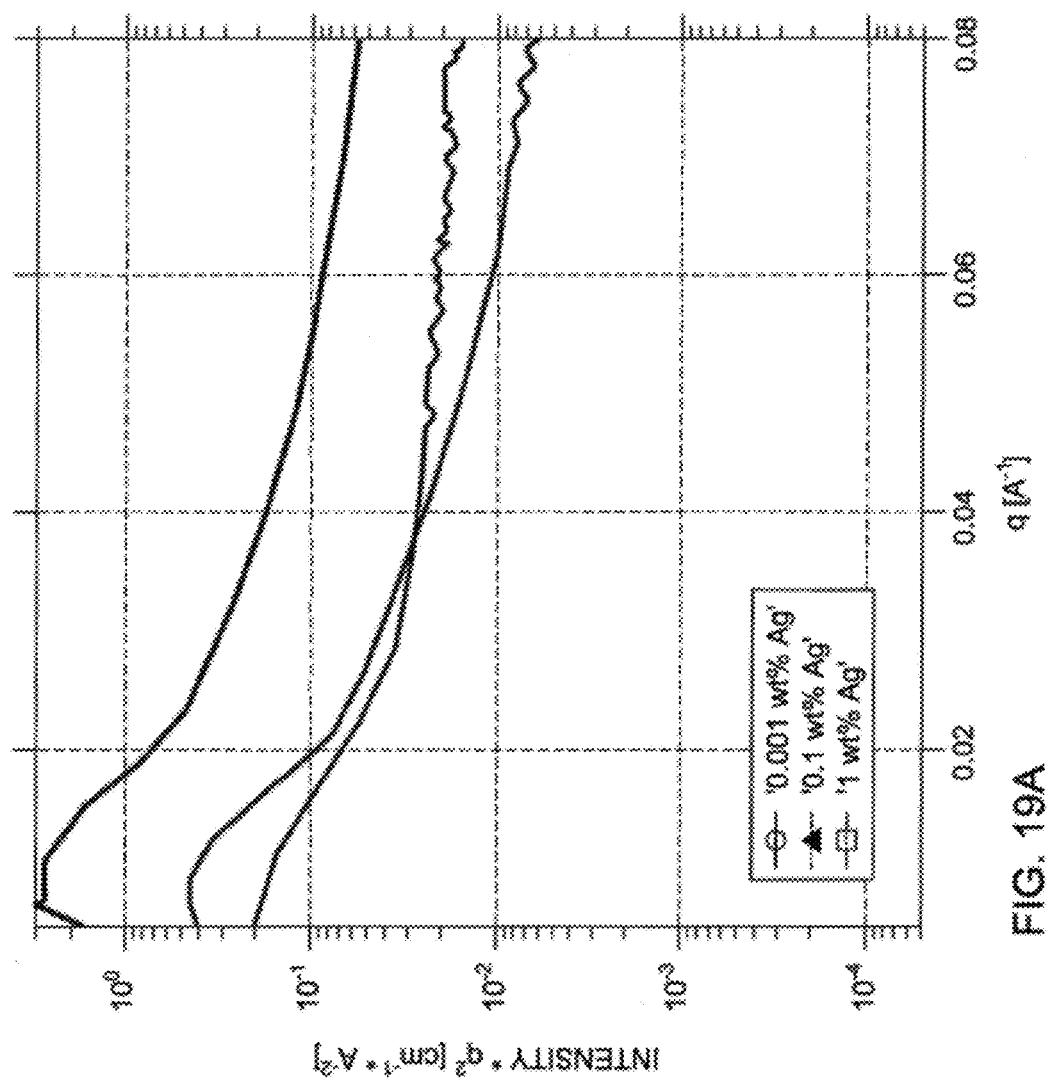
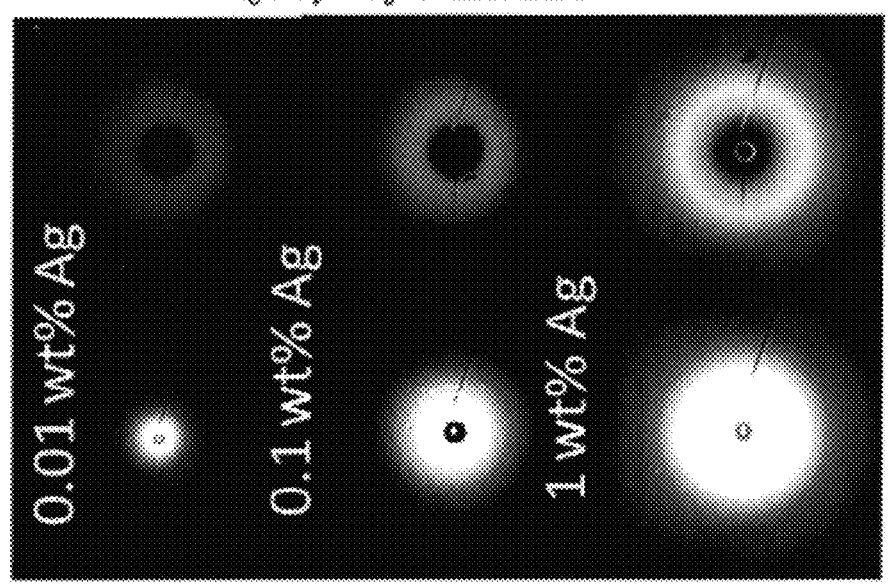
FIG. 19A

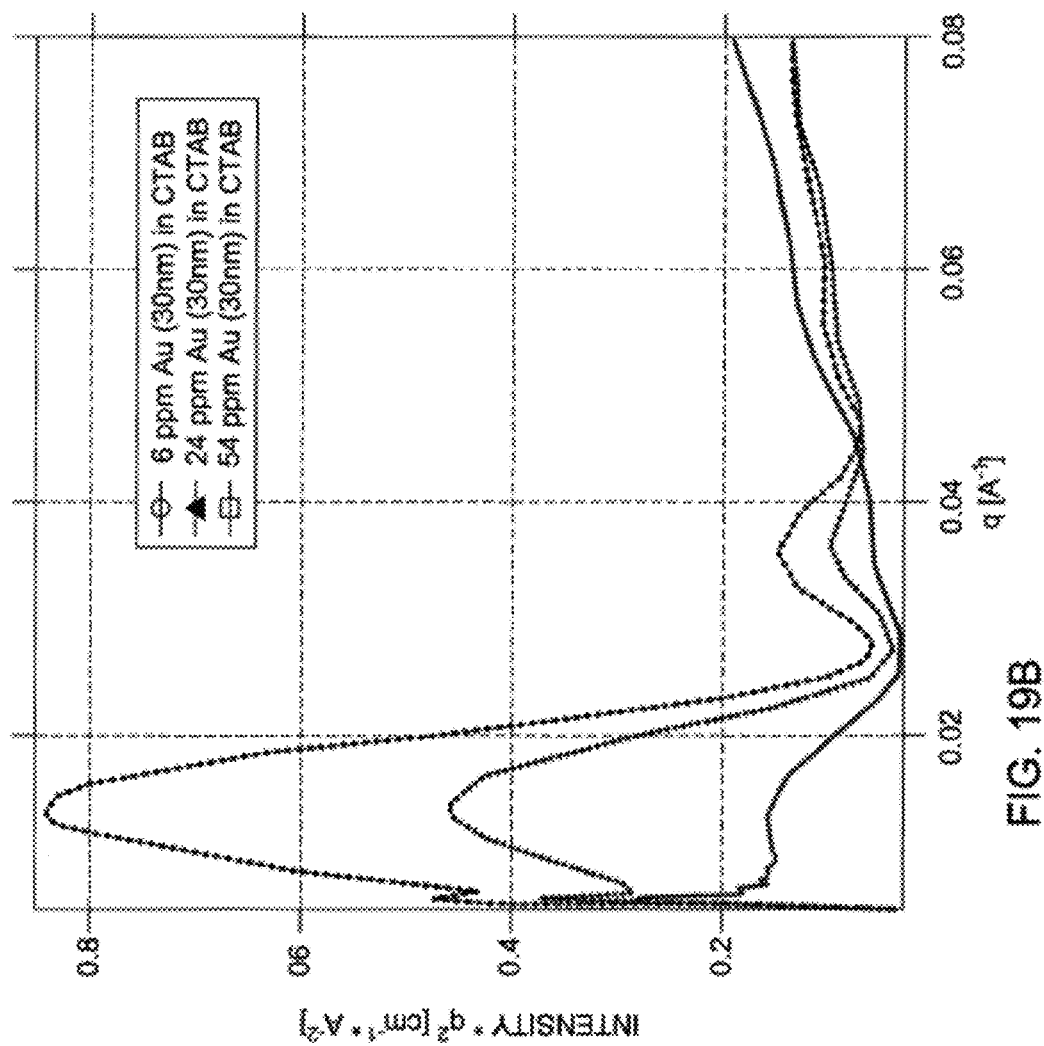
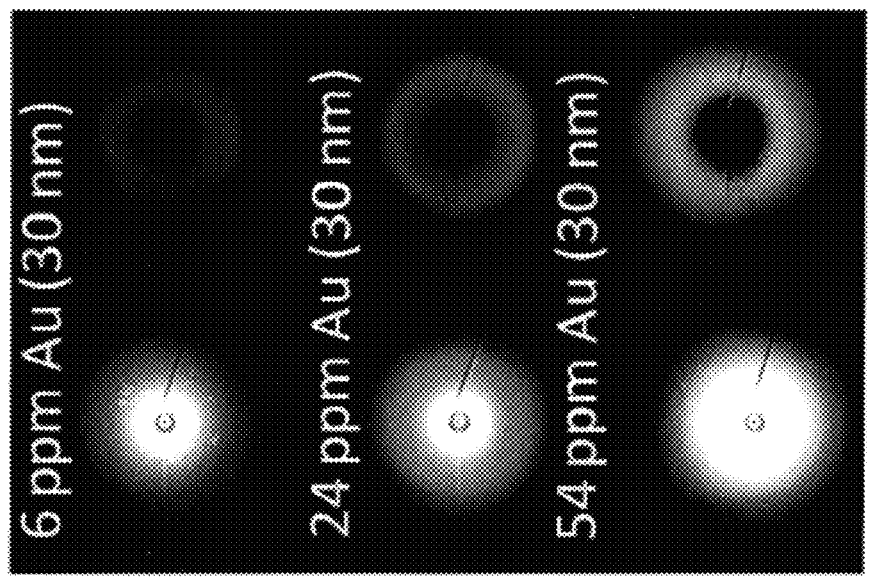
FIG. 19B

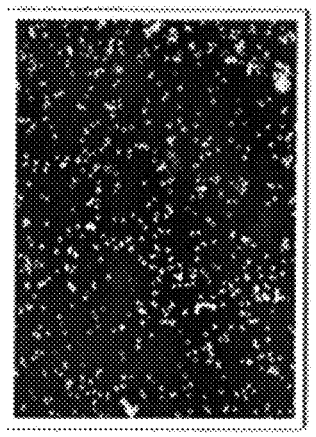
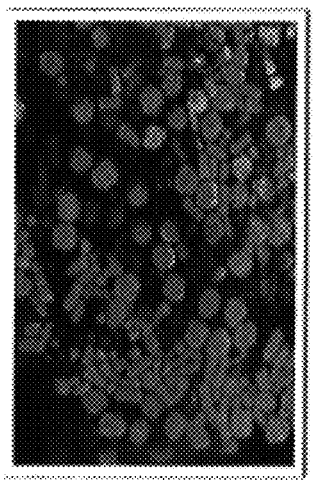
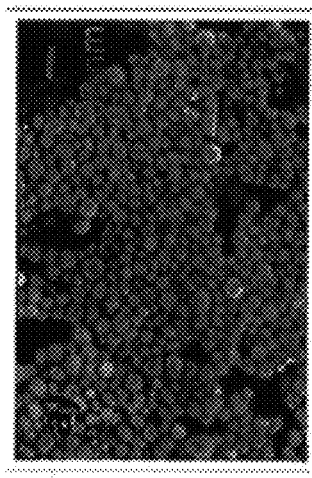
FIG. 24A
FIG. 24B
FIG. 24C

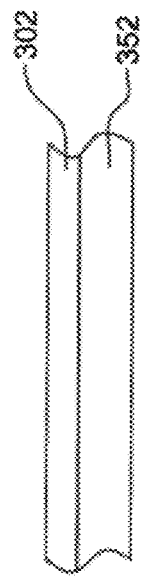
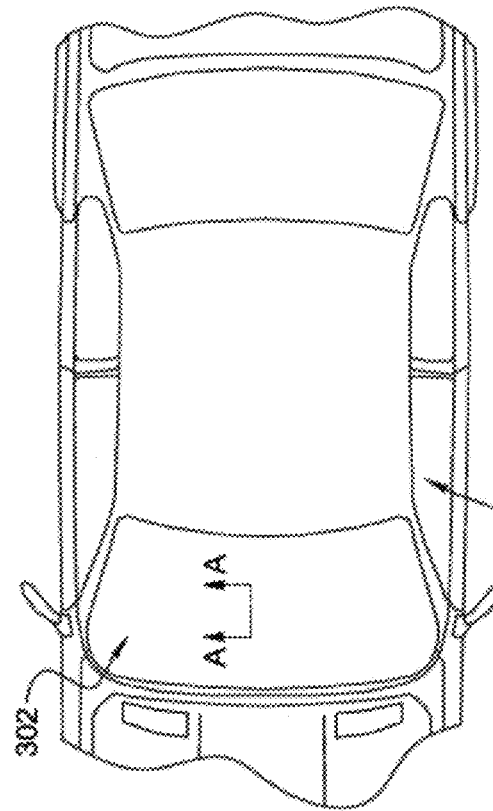
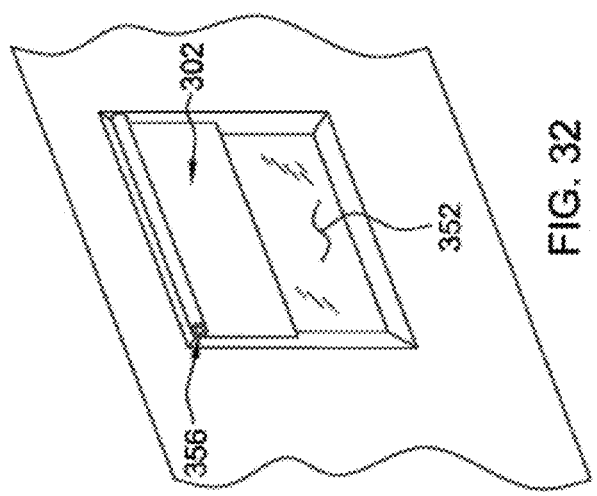
FIG. 34
FIG. 33
FIG. 32

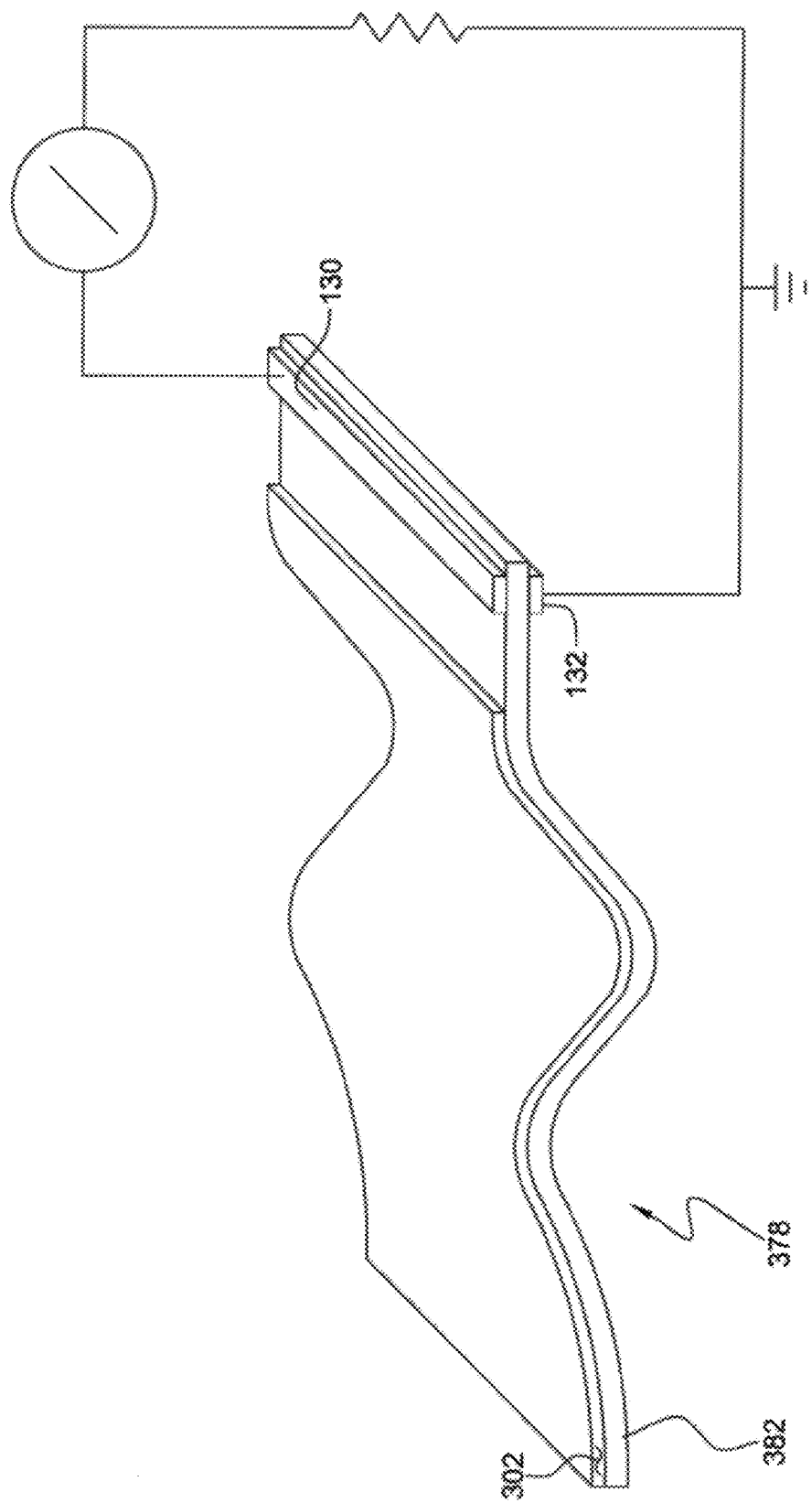

NANOPARTICLE ARRAY COMPRISING DISTRIBUTED NANOPARTICLES

CROSS REFERENCE TO RELATED APPLICATIONS

This application claims priority to U.S. Patent Application No. 61/454,392 filed Mar. 18, 2011 entitled, "Nanoparticle Array Comprising Distributed Nanoparticles." The above application is incorporated herein by reference in its entirety.

STATEMENT REGARDING FEDERALLY SPONSORED RESEARCH OR DEVELOPMENT

The disclosed invention was made with government support under Grant No. CBET 1049454 from the National Science Foundation. The government has rights in this invention.

FIELD OF THE INVENTION

The present invention relates to nanoparticles in general and specifically to a network comprising nanoparticles.

BACKGROUND OF THE INVENTION

Various approaches for providing light absorbing materials have been proposed. A popular approach is the incorporation of a light trapping layer that consists of noble metal NPs onto the PV device. Nanostructured plasmonic interfaces for this purpose have been fabricated by using lithography, vapor deposition, de-wetting of thin metal films by ns and fs pulsed lasers, and wet chemistry using self-assembled monolayers. Economical scale-up and adaption of such processes to fabricate interfaces with multiple species/shapes/sizes in a controllable and repeatable fashion are not straightforward.

SUMMARY OF THE INVENTION

There is set forth herein a method for providing a nanoparticle array. A nanoparticle network can be provided by nanoparticles combined with surfactant micelle chains. The nanoparticle network can be provided by distributing metal nanoparticles in a surfactant solution and agitating the surfactant solution comprising the nanoparticles to form a gel comprising the nanoparticle network which can be characterized by a distributed array of nanoparticles combined with surfactant micelle chains within a fluid. The gel can comprise a fluid in a continuous phase and the nanoparticles in a discontinuous phase. Apparatus having arrays of nanoparticles are also set forth herein.

BRIEF DESCRIPTION OF THE DRAWINGS

FIG. 1 is an absorption profile of a nanoparticle array having a narrow band absorptive profile;

FIG. 2 is an absorption profile of a nanoparticle array having a wide band absorptive profile;

FIG. 3 is an absorption profile for a nanoparticle array having a band gap of absorption;

FIG. 15($b$) illustrates steady state viscosity of a wormlike micellar solution of 100 mM CTAB and 200 mM $NaNO_3$ as a function of Ag nanoparticles weight fraction;

FIG. 16($b$) illustrate plasmonic response spectrum of a multi-component system (refer to Table II for composition details);

In FIG. 18($b$) is a depiction of multicomponent plasmonic nanogels with tunable optical properties;

FIG. 19($a$) shows SAXS images of plasmonic gel with Ag nanoparticles ($R_{ave}$=17 nm);

FIG. 19($b$) shows SAXS images of plasmonic gel with spherical Au nanoparticles (R=15 nm);

FIG. 20($b$) illustrates steady state viscosity of a wormlike micellar solution of 100 mM CTAB and 200 mM $NaNO_3$ as a function of Ag NPs weight fraction. Lines represent fits to the Carreau model;

FIG. 21($b$) illustrates plasmonic response of rod-like Au NPs ($d_{rod}$=25 nm) of various aspect ratios ($\alpha$);

FIG. 24($a$) is a SEM photograph of 1 wt % Ag ($R_{ave}$=17 nm) plasmonic gel coating on silicon;

FIG. 24($b$) is a SEM photograph of multicomponent plasmonic gel coating on silicon;

FIG. 24($c$) is a SEM photograph of 0.1 wt % Au ($R_{ave}$=7 nm) plasmonic gel coating on silicon;

FIG. 32 is a perspective schematic illustration of a building window having an associated light transmissive structural body comprising an array of nanoparticles;

FIG. 33 is a perspective schematic illustration of a vehicle window having an associated light transmissive structural body comprising an array of nanoparticles;

FIG. 34 is a cross sectional side illustration of a vehicle window having an array of nanoparticles;

FIG. 35 is a perspective schematic illustration of a flexible photovoltaic apparatus having an array of nanoparticles;

DETAILED DESCRIPTION OF THE INVENTION

There is set forth herein a method for providing a nanoparticle array. A nanoparticle network can be provided by nanoparticles combined with surfactant micelle chains. The nanoparticle network can be provided by distributing metal nanoparticles in a surfactant solution and agitating the surfactant solution comprising the nanoparticles to form a gel comprising the nanoparticle network which can be characterized by a distributed array of nanoparticles combined with surfactant micelle chains within a fluid. The gel can comprise a fluid in a continuous phase and the nanoparticles in a discontinuous phase.

In one embodiment, the distributed array of metal nanoparticles within the gel can be transferred to a structural body. For transferring the distributed array of metal nanoparticles to a structural body, the gel comprising the nanoparticle network can be disposed on the structural body, e.g., by dipping, spin coating, and spraying. The fluid of the gel can be evaporated and the surfactant can be removed.

An array of metal nanoparticles as set forth herein, whether defining a nanoparticle network, or transferred to a structural body, can feature tunable light absorptive properties. The light absorptive properties can be varied by varying the concentration, size, shape, and material of the metal particles.

In FIG. 1 there is shown an exemplary absorption profile for a typical metal particle of a certain shape. Provided the diameter of the particle, d, is $d \ll \lambda_R$, the particle can exhibit absorption resonance at the wavelength $\lambda = \lambda_R$. The resonant absorption wavelength, $\lambda_R$, of a particle can be changed by selecting a different metal for the particle or by changing a shape of the particle. An array of nanoparticles 14 having a single type particle of a single material can have the absorption profile as shown in FIG. 1. By adding several shapes of particles and/or particles of several materials, broad band absorption properties can be achieved as shown in FIG. 2. With an absorption profile as shown in FIG. 3, an array of nanoparticles 14 can have a band gap, $\lambda_G$, of absorption within a certain wavelength band, thus exhibiting the visible color of the band gap, $\lambda_G$, under white light.

Figure 5:
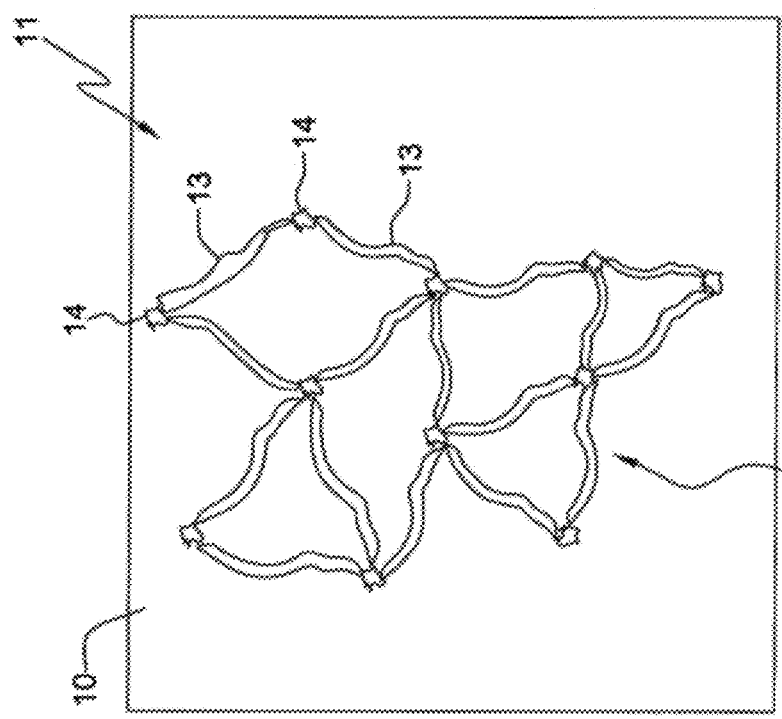
FIG. 5 is a diagram of solution comprising nanoparticle network.
Figure 4:
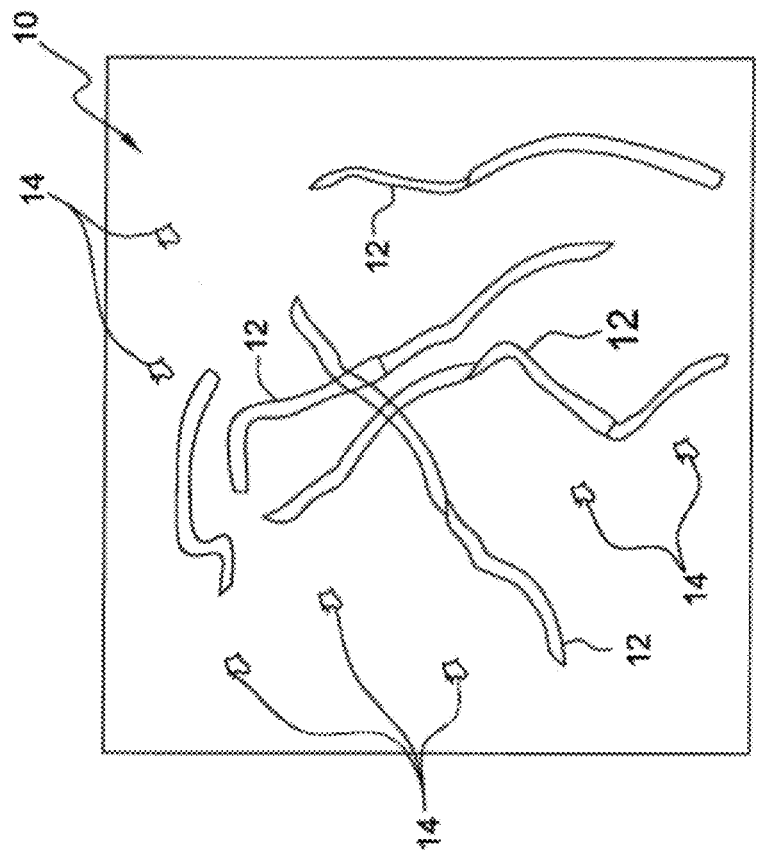
FIG. 4 is a diagram illustrating a surfactant solution.

A method for making a structural body having an incorporated array of light absorptive metal nanoparticles is described with reference to FIGS. 4 and 5. In one embodiment, surfactant solution 10 (FIG. 4) can be provided having wormlike surfactant micelles 12 in an aqueous solution. The metal nanoparticles 14 for distribution in the aqueous surfactant solution can comprise, e.g., silver (Ag), gold (Au), copper (Cu), and aluminum (Al). The concentration, size, shape, and material of the metal particles can be varied. Regarding different shapes, different shapes can be selected, e.g., as between spherical and cylinder. A representation of a surfactant solution 10 having dispersed therein metal nanoparticles is shown in FIG. 4, wherein the solution comprises wormlike surfactant micelles 12.

Agitating of the surfactant solution can comprise, e.g., shaking and stirring. Agitating of the surfactant solution can break surfactant micelles 12 yielding micelles chains 13 which can combine with nanoparticles 14 to yield a gel 11 (FIG. 5) having a nanoparticle network 16 including nanoparticles disposed in a fluid. Nanoparticle network 16 can be characterized by metal nanoparticles 14 combined with surfactant micelle chains 13. Nanoparticle network 16 can maintain metal nanoparticles 14 within gel 11 in a stable and distributed manner.

The resulting gel 11 can be disposed on an external body by way of a number of methods, e.g., dipping, spin coating, and spraying. By disposing the resulting solution on a structural body, the nanoparticle network can be transferred to the external body. In some embodiments, a low viscosity of gel 11 can encourage processability and the transfer of nanoparticles to a structural body.

Higher viscosity gels can be useful for a variety of applications. A viscosity of gel 11 can be increased by increasing a concentration of surfactant to yield additional micelle chains or by increasing a concentration of salt.

In one aspect of gel 11, gel 11 can be subject to state changes. On subjecting gel 11 to heat above a threshold temperature, network 16 (FIG. 5) can break down causing particles 14 to aggregate, alleviating light absorption properties of gel 11. Accordingly, gel 11 can be controlled to transition between absorptive and non-absorptive states by way of application and removal of heat.

Figure 7:
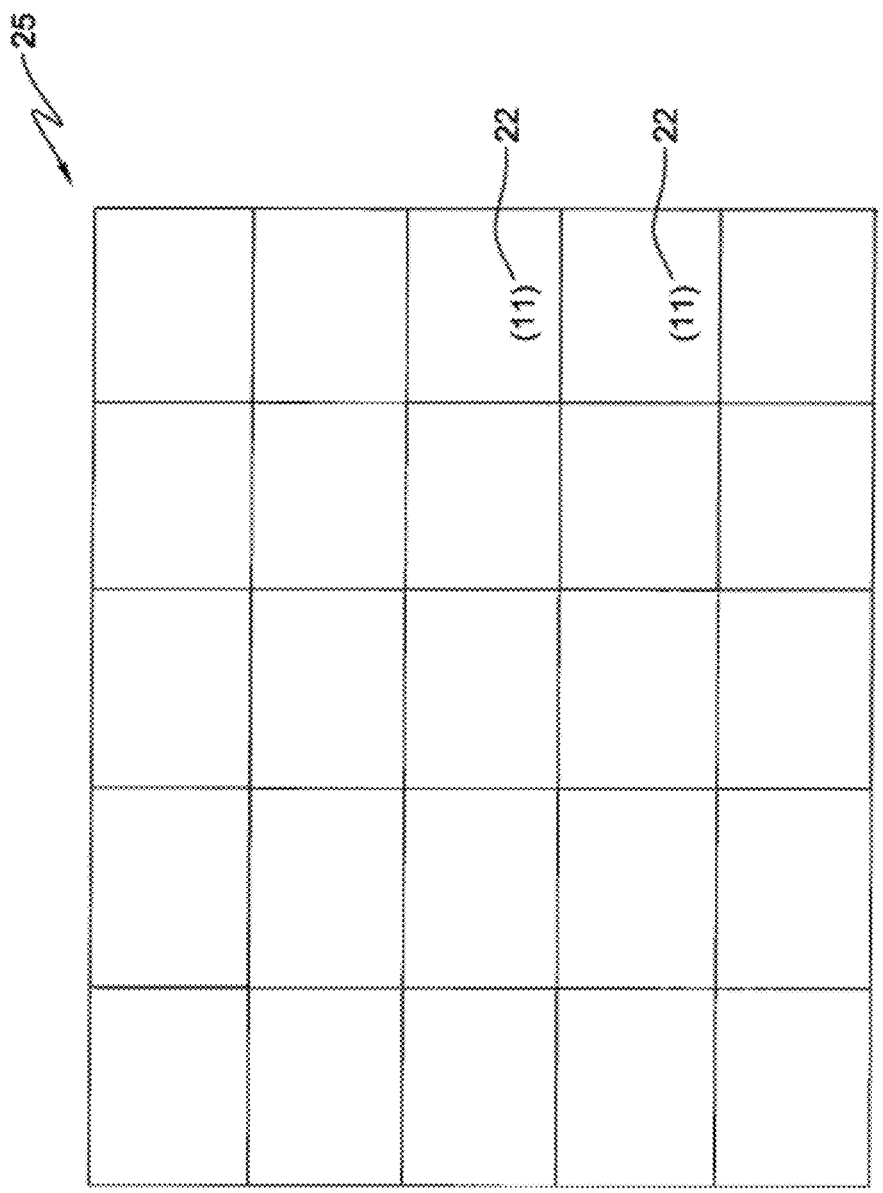
FIG. 7 is a diagram of a display comprising pixels having volumes of nanoparticle gel.

In FIG. 7, volumes of gel 11 can be disposed in pixels 22 of a display 25. An exhibited visible color exhibited by each pixel can be controlled by application of heat. For example, if gel 11 features a band gap, $\lambda_G$, in absorption as shown in the absorptive profile diagram of FIG. 3, pixel 22 can exhibit the visible color corresponding to band gap, $\lambda_G$, with network 16 in a stable state, and can exhibit a gray tone with network 16 in a breakdown state. The array of nanoparticles 14 set forth herein can exhibit numerous uses and commercial applications while being disposed in a fluid defining gel 11.

In one embodiment, the structural body integrating an array of nanoparticles 14 can comprise an $Si/SiO_2$ wafer 102. For making such apparatus, gel 11 can be disposed on $SiO_2$ layer 112 for transferring nanoparticle network 16 onto $SiO_2$ layer 112 as shown in FIG. 3. Electrodes 130, 132 can be formed on wafer 102 as shown for formation of a solar cell. In such embodiment, the concentration, size, shape and material of metal nanoparticles 12 can be selected to yield broad band absorption performance, as indicated in the example of FIG. 2.

In one embodiment, gel 11 having a stable distributed array of nanoparticles can be disposed on a structural body provided by lens for transfer of a distributed array of nanoparticles 14 on to the lens. In one embodiment, the lens can be an eyeglass lens. In such embodiment, the shape and material of the nanoparticles can be selected for narrow band, e.g., UV absorption.

Figure 8:
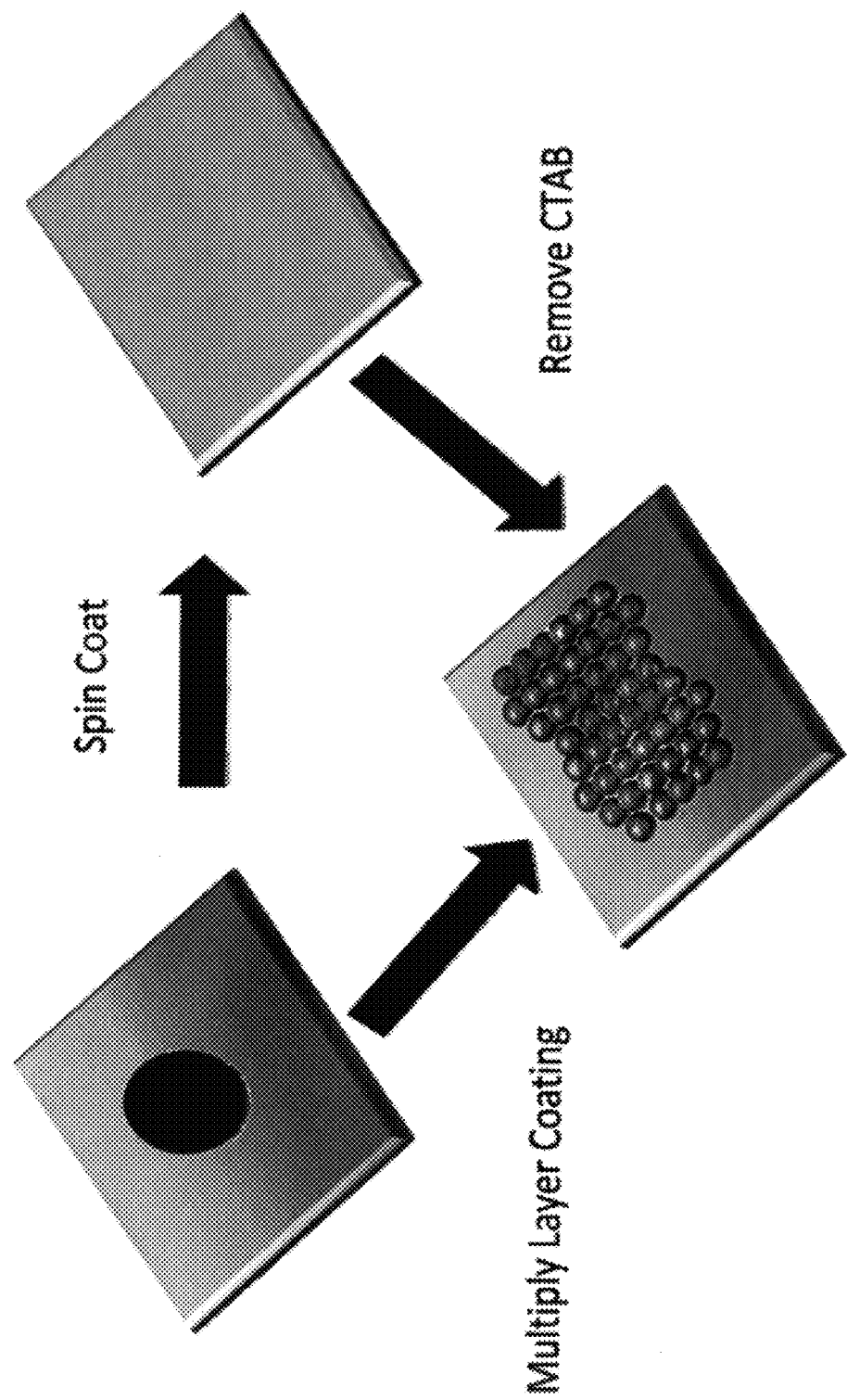
FIGS. 8-13 are diagrams illustrating uniformity features herein.
Figure 11:
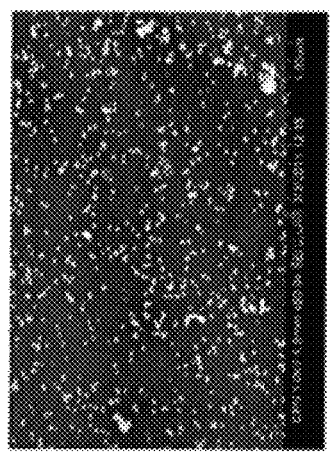
Figure 10:
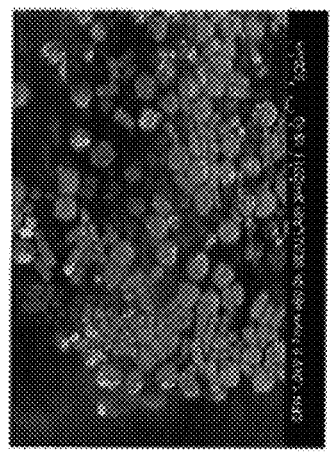
Figure 9:
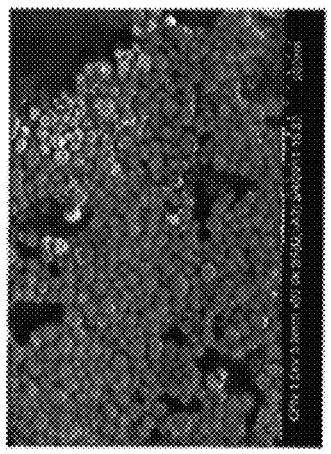

Referring to FIG. 8, there is illustrated a method wherein a gel 11 is disposed on a structural body and subject to evaporation and removal of surfactant to yield an array of metal nanoparticles integrated in the structural body. Referring to FIG. 9, there is shown an electron microscope view of an array of silver nanoparticles having a diameter of about 35 nm. Referring to FIG. 10, there is shown an electron microscope view of a nanoparticle array having nanoparticles of different sizes and materials. The array of FIG. 10 features broad band absorption. Regarding FIG. 11, there is shown an electron microscope view of a nanoparticle array having gold nanoparticles ranging in size from about 1-15 nm.

Figure 12:
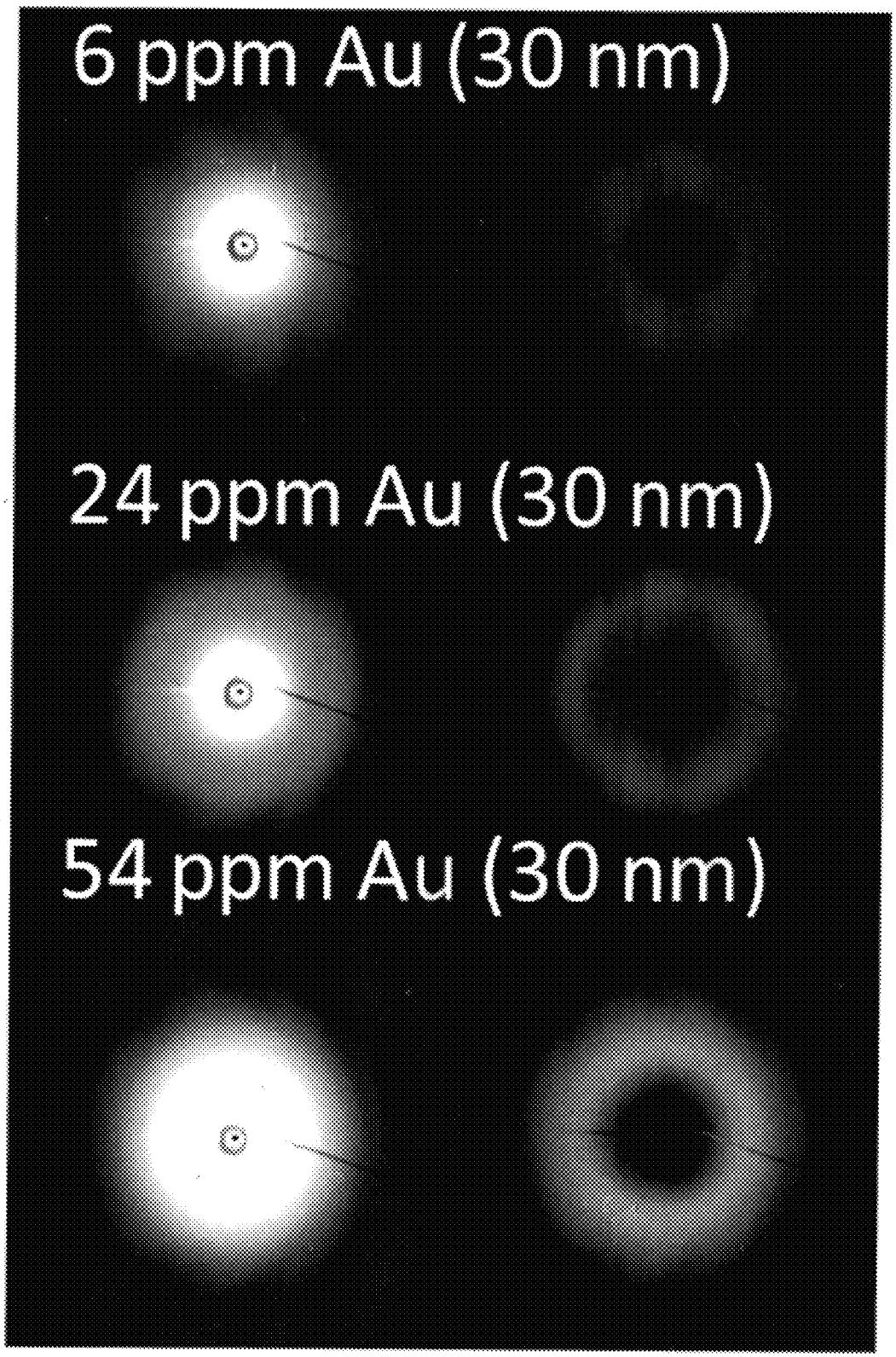
Figure 13:
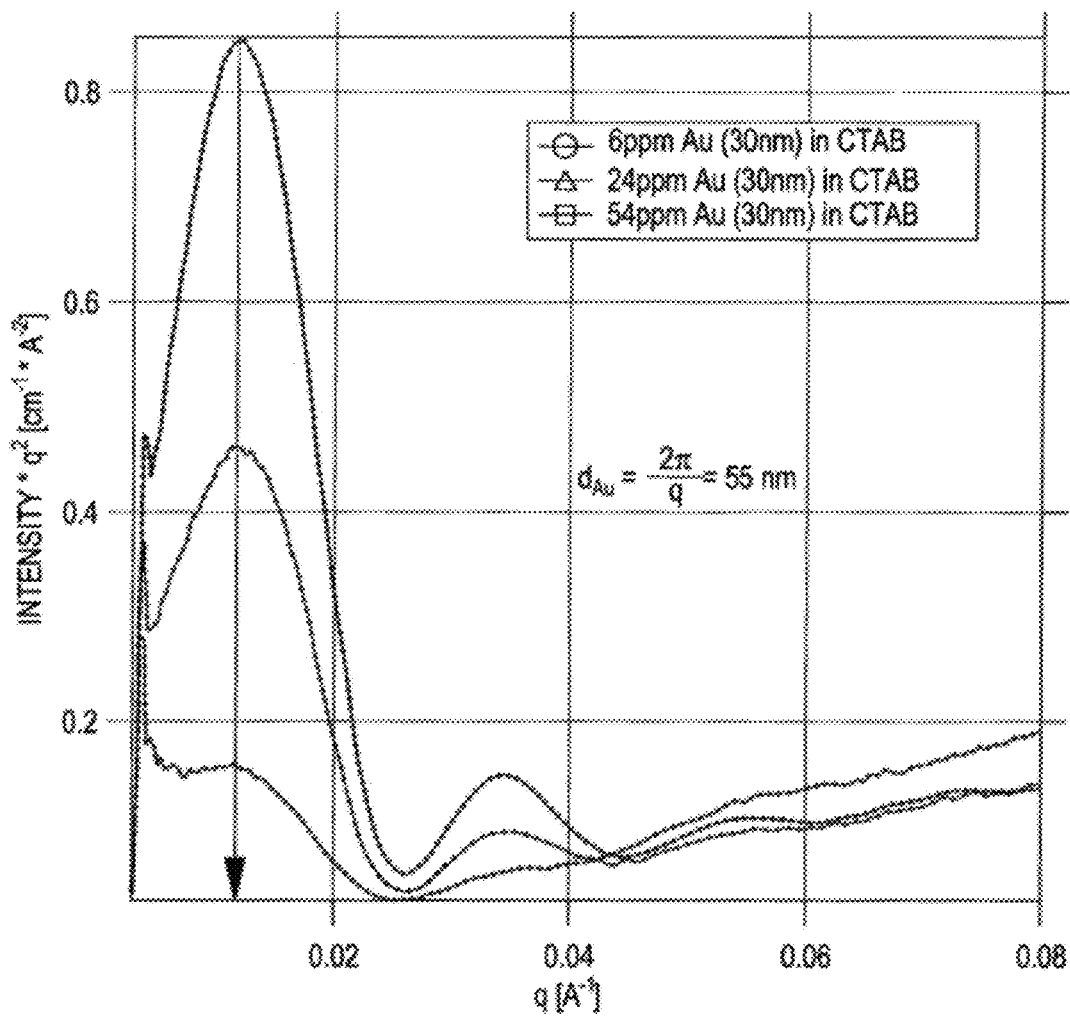

Referring to FIG. 12, there is shown a small angle x-ray scattering view of gel including a nanoparticle array having increasing (6 ppm, 24 ppm, 54 ppm) concentrations of gold. Referring to FIG. 13, there is shown a graph illustrating intensity versus scattering factor, q, for three different concentrations of a gel comprising a nanoparticle array.

FIG. 13 illustrates that an inter-particle (center to center) spacing between nanoparticles, d, does not change substantially irrespectively of a concentration, thus indicating a uniform spacing distance between nanoparticles distributed in a nanoparticle array. A spacing distance of particles in a nanoparticle array having a uniform spacing distance can be constant, i.e., can be of statistically insignificant variance.

Details of a Nanoparticle Network Comprising Nanoparticles, according to one embodiment, are set forth in the manuscript by T. Cong, S. N. Wani, and R. Sureshkumar, entitled "Multicomponent plasmonic nanogels with tunable optical properties via solution phase self-assembly" which is attached as Appendix A of U.S. Patent Application No. 61/454,392 and in the manuscript entitled "Complex Fluids with Robustly Tunable Optical Properties: Experiments and Theory" which is attached as Appendix B of U.S. Patent Application No. 61/454,392 and forms part of the present patent application. Appendix A and Appendix B of U.S. Patent Application No. 61/454,392, with reformatting including reformatting to avoid reference numeral duplication, are presented herein below.

[Beginning of Disclosure from Appendix A of U.S. Patent No. 61/454,392]

Multicomponent Plasmonic Nanogels with Tunable Optical Properties via Solution Phase Self-Assembly.

Metal nanoparticles were uniformly distributed in a wormlike surfactant micelle solution to produce plasmonic nanogels that consist of micelle-nanoparticle networks with linear dimensions of O (10) nm. The optical absorbance of the gels can be robustly varied by changing the nanoparticle type (Au or Ag), size, shape and/or concentration. Specifically, multicomponent nanogels capable of broadband absorption of the solar radiation were synthesized. These gels exhibited viscoelasticity and shear thinning with low plateau elastic moduli and viscosities. Hence, they can be easily processed to make thin films and interfaces with tunable optical properties.

Figure 14:
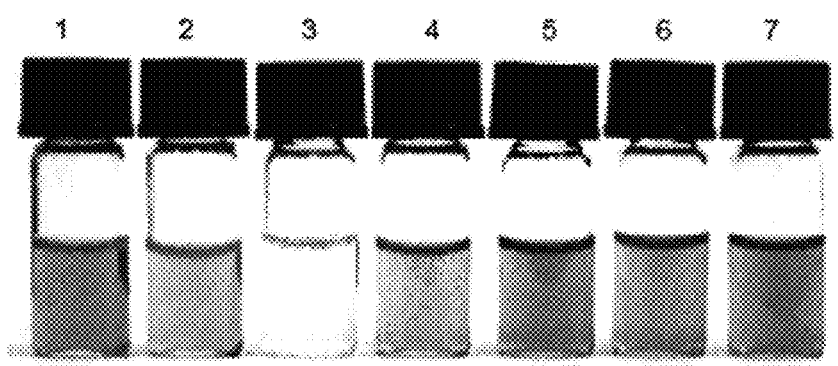
FIG. 14, illustrates multicomponent plasmonic nanogels with tunable optical properties.

Fluids with tunable optical properties are of fundamental and practical interest. (C. Monat, P. Domachuk and B. J. Eggleton, Nat. Photon. 1, 106-114 (2007); D. Psaltis, S. R. Quake and C. Yang, Nature 442, 381-386 (2006)). If the optical properties are due to the presence of plasmonic nanoparticles (nanoparticles), they can be used to manufacture thin films and interfaces for applications such as light trapping in photovoltaic devices and molecular detection. Typically, metal nanoparticles in a solution are unstable and tend to agglomerate leading to phase separation. Herein, it is shown that a network of wormlike surfactant micelles (WLMs) in an aqueous solution can be used as a template for producing stable multicomponent suspensions of Au and/or Ag with desired optical properties. Metal nanoparticles are hypothesized to bridge the micellar fragments formed upon mechanical agitation of the solution, thereby producing a permanent nanogel. This self-assembly mechanism is similar to that observed for silica nanoparticles in Cetyltrimethylammonium Bromide (CTAB) micelle solutions. (F. Nettesheim, M. W. Liberatore, T. K. Hodgdon, N. J. Wagner, E. W. Kaler, and M. Vethamuthu, Langmuir 24, 7718-7726 (2008); M. E. Helgeson, T. K. Hodgdon, E. W. Kaler, N. J. Wagner, M. Vethamuthu, and K. P. Ananthapadmanabhan, Langmuir 26, 8049-8060 (2010)). The micelle-metal nanoparticle complexes, hereafter referred to as plasmonic nanogels (PNGs), exhibit a long shelf life (~weeks) and color uniformity as shown in FIG. 14. The shape, size and concentration of the nanoparticles can be varied to tune the optical properties of the PNGs in a way that they absorb radiation over a broadband of wavelengths. The synthesis, structure, rheology and absorption characteristics of the PNGs are discussed in this Letter. Regarding FIG. 14, there are shown multicomponent plasmonic nanogels with tunable optical properties. 1): 13.3 ppm Au(S, d=30). 2): 8 ppm Au(S, d=30)+10 ppm Ag(S, d=35). 3): 13.3 ppm Ag(S, d=35). 4): 10 ppm Ag(S, d=35)+10 ppm Au (R, $\alpha$=2.3). 5): 13.3 ppm Au (R, $\alpha$=2.3). 6): 10 ppm Au(S, d=30)+10 ppm Au(R, $\alpha$=2.3). 7): 6.7 ppm Au(S, d=30)+6.7 ppm Ag(S, d=35)+5 ppm Au (R, $\alpha$=2.3). S and R denote spherical and rod-like nanoparticles, respectively.

Improving the efficiency of thin-film photovoltaic (PV) devices using plasmonic interfaces has been actively researched. (H. A. Atwater and A. Polman, Nat. Mater. 9, 205-213 (2010)). A popular approach is the incorporation of a light trapping layer that consists of noble metal nanoparticles onto the PV device. (S. Pillai, K. Catchpole, T. Trupke and M. Green, J. Appl. Phys. 101, 093105 (2007); J. Trice, H. Garcia, R. Sureshkumar, and R. Kalyanaraman, Proc. SPIE, 6648, 66480L, (2007)). Nanostructured plasmonic interfaces for this purpose have been fabricated by using lithography, (E. M. Hicks, S. Zou, G. C. Schatz, K. G. Spears, R. P. van Duyne, L. Gunnarsson, T. Rindzevicius, B. Kasemo and M. Käll, Nano Lett. 5, 1065-1070 (2005); L. M. Campos, I. Meinel, R. G. Guino, M. Schierhorn, N. Gupta, G. D. Stucky, C. J. Hawker, Adv. Mater. 20, 3728-3733 (2008)) vapor deposition, (S. Pillai, K. Catchpole, T. Trupke and M. Green, J. Appl. Phys. 101, 093105 (2007); Y. H. Lanyon, G. de Marzi, Y. E. Watson, A. J. Quinn, J. P. Gleeson, G. Redmond and D. W. M. Arrigan, Anal. Chem. 79, 3048-3055 (2007)) dewetting of thin metal films by ns (Y. Wu, J. D. Fowlkes, P. D. Rack, J. A. Diez and L. Kondic, Langmuir 26, 11972-11979 (2010); L. Kondic, J. A. Diez, P. D. Rack, Y. Guan and J. D. Fowlkes, Phys. Rev. E 79, 026302 (2009); C. Favazza, J. Trice, R. Kalyanaraman, R. Sureshkumar, Appl. Phys. Lett. 91, 043105 (2007); J. Trice, C. Favazza, D. Thomas, H. Garcia, R. Kalyanaraman and R. Sureshkumar, Phys. Rev. Lett. 101, 017802 (2008); C. Favazza, R. Kalyanaraman and R. Sureshkumar, Nanotechnology 17, 4229-4234 (2006)) and fs (A. Kuznetsov, J. Koch and B. Chichkov, Appl. Phys. Mater. Sci. Process. 94, 221-230 (2009)) pulsed lasers and wet chemistry using self-assembled monolayers. (L. A. Porter, H. C. Choi, J. M. Schmeltzer, A. E Ribbe, L. C. C. Elliott and J. M. Buriak, Nano Lett. 2, 1369-1372 (2002)). Economical scale up and adaptation of such processes to fabricate interfaces with multiple species/shapes/sizes in a controllable and repeatable fashion are not straightforward. (H. Krishna, C. Favazza, R. Sureshkumar and R. Kalyanaraman, Mater. Res. Soc. Symp. Proc. 960, 86-92 (2007)). Multicomponent PNGs reported herein have relatively low viscosity and low elastic modulus. Hence they are processable and, among other things, can be spin- or dip-coated onto substrates to produce plasmonic interfaces or used in optofluidic devices.

WLMs are elongated and semiflexible cylindrical aggregates formed by the self-assembly of amphiphilic surfactants in aqueous solutions. (J. F. Berret, *Molecular Gels*, (Springer, 2006, Part 6, 667-720)). They are referred to as "living polymers." While they exhibit configurational similarities to synthetic polymers, they exist in a state of dynamic equilibrium between the scission and recombination of the micellar chains. (J. Yang, Curr. Opin. Colloid. Interface. Sci. 7, 276-281 (2002)). At sufficiently large concentrations, the micellar chains entangle to form a viscoelastic network with linear dimension on the order of $(k_bT/G_0)^{1/3}$ where $G_0$ is the plateau storage modulus and $k_b$ and T represent the Boltzmann constant and absolute temperature respectively. (M. E. Cates and S. J. Candau, J. Phys.: Condens. Matter. 2, 6869-6892 (1990)). The addition of colloidal particles to an entangled WLM solution has been shown to influence the network structure through the formation of a double network of entanglements and nanoparticle-mediated junctions. (F. Nettesheim, M. W. Liberatore, T. K. Hodgdon, N. J. Wagner, E. W. Kaler, and M. Vethamuthu, Langmuir 24, 7718-7726 (2008); M. E. Helgeson, T. K. Hodgdon, E. W. Kaler, N. J. Wagner, M. Vethamuthu, and K. P. Ananthapadmanabhan, Langmuir 26, 8049-8060 (2010)). Such networks can distribute the nanoparticles within the fluid in a stable and uniform fashion.

PNGs studied herein were shear thinning viscoelastic fluids whose structure can be inferred from rheological measurements. Linear and nonlinear rheological measurements were made on 100 mM CTAB/200 mM NaNO$_3$ samples with 0, 0.01, 0.05 and 0.1 wt. % Ag nanoparticles using a TA Instruments AR-G2 rheometer. The addition of the salt was necessary to obtain a robust viscoelastic response. Linear viscoelastic properties, namely the storage and loss moduli G' and G" respectively, were measured by subjecting the samples to small amplitude oscillatory shear flow at forcing frequencies ranging from 0.2 to 250 Hz. G' and G" data were fitted to the Maxwell model (B. A. Schubert, E. W. Kaler, and N. J. Wagner, Langmuir, 19, 4079-4089 (2003); R. Granek and M. E. Cates, J. Chem. Phys. 96, 4758 (1992)) to determine the structural parameters and the stress relaxation time $\lambda_r$ of the PNGs. This model describes the frequency ($\omega$) dependence of the storage and loss moduli as:

$$G'(\omega) = \frac{G_0 \lambda_r^2 \omega^2}{1 + \lambda_r^2 \omega^2}, \quad (1)$$

$$G''(\omega) = \frac{G_0 \lambda_r \omega}{1 + \lambda_r^2 \omega^2} + \eta_\infty \omega. \quad (2)$$

Figure 15A:
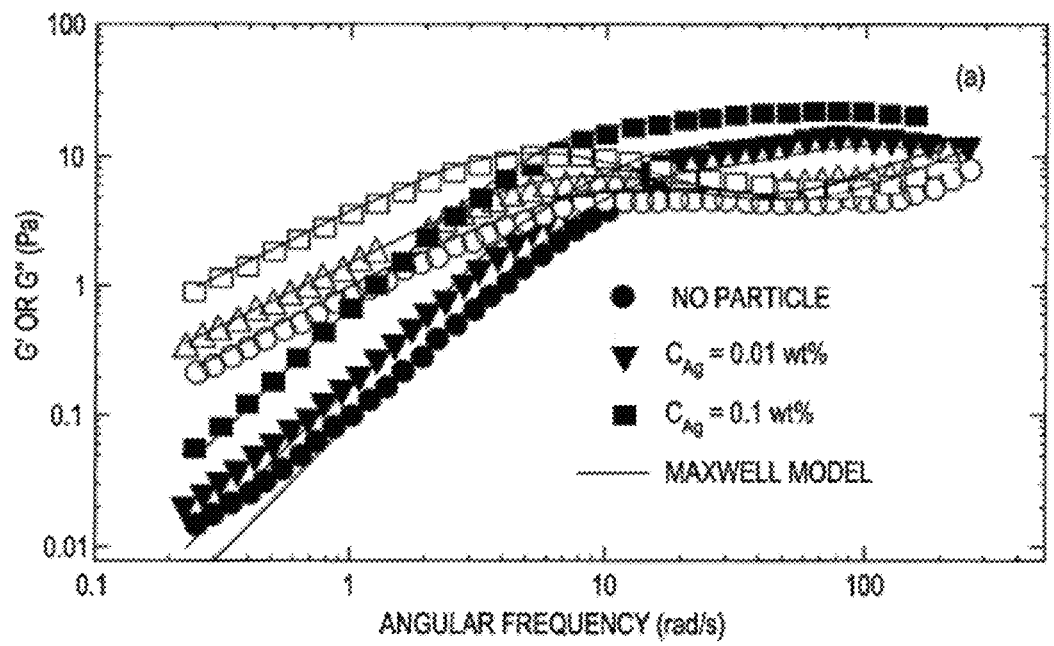
FIG. 15($a$) Linear viscoelastic spectrum of 100 mM CTAB and 200 mM $NaNO_3$ as a function of Ag NANO-PARTICLEs weight fraction (Storage modulus, G', closed symbols and loss modulus, G", open symbols)
Figure 15B:
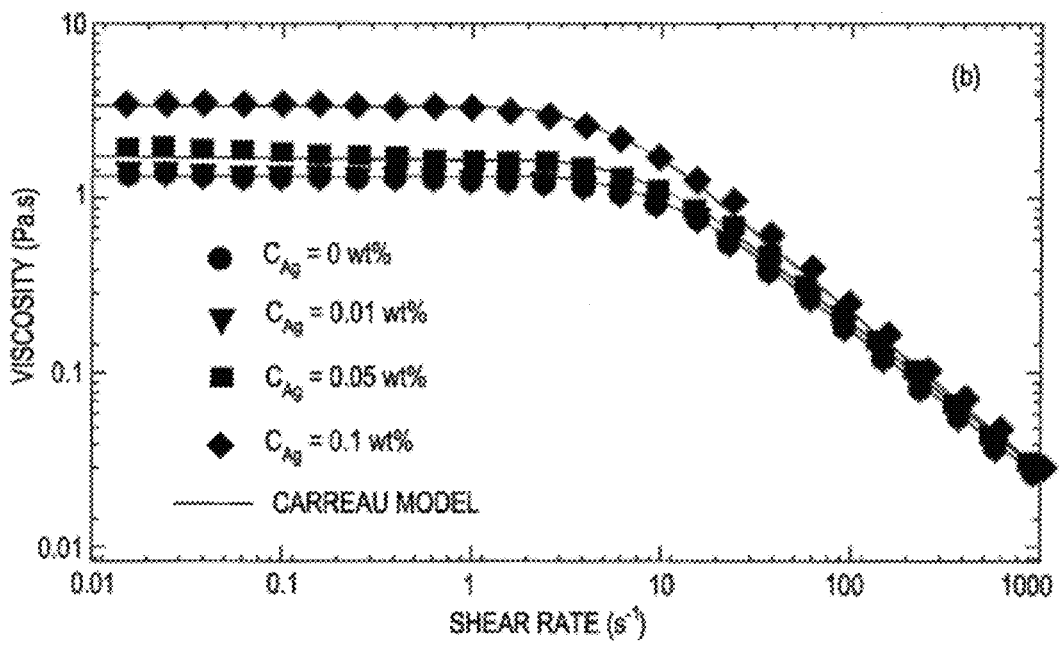

FIG. 2(a) shows G' and G" as functions of $\omega$ at 25° C. for PNGs containing different weight fractions of Ag. Maxwell model fitted the data well at low and intermediate frequencies, indicating that a single relaxation time dominated the linear response. (M. E. Cates and S. J. Candau, J. Phys.: Condens. Matter. 2, 6869-6892 (1990)). The relaxation time $\lambda_r$ was estimated as $1/\omega_r$, where $\omega_r$ is the frequency at which G' and G" curves crossover. Above this point, G' continued to increase with increasing $\omega$ at a decreasing rate until it reached a plateau value $G_0$. Conversely, a local minimum $G''_{min}$ was observed in the loss modulus at a sufficiently large frequency $\omega_{min}$. This minimum in G" is interpreted as the inverse of the breakage time of the micelles, (B. A. Schubert, E. W. Kaler, and N. J. Wagner, Langmuir, 19, 4079-4089 (2003)) i.e., $\omega_{min} = 1/\lambda_{br}$. The mesh or "hole" size $\xi_M$ was estimated from the plateau modulus as $(k_bT/G_0)^{1/3}$, the entanglement length $L_E$, i.e., the average distance between neighboring entanglements, as $\xi_M^{5/3}/L_P^{2/3}$ where $L_p$ is the persistence length, (R. Granek and M. E. Cates, J. Chem. Phys. 96, 4758 (1992)) which was taken to be 26 nm as estimated from optical birefringence measurements. (T. Shikata, S. J. Dahman and D. S. Pearson, Langmuir, 10, 3470-3476 (1994)). The increase in $G_0$ observed upon the addition of the nanoparticles can be interpreted as a commensurate increase in the network density $\rho = G_0/k_bT$ caused by the formation of nanoparticle-mediated network junctions. As seen from Table I, $\rho$ for the 0.1 wt. % Ag/micelle solution exceeded that of the pure micelle solution by $2.94 \times 10^{21}/m^3$. The reptation time $\lambda_{rep}$ was estimated by applying Cates' theory for WLM fluids (M. E. Cates and S. J. Candau, J. Phys.: Condens. Matter. 2, 6869-6892 (1990)) as $\lambda_{rep} = \lambda_r^2/\lambda_{br}$, assuming that the kinetic timescale associated with the scission/recombination reactions is relatively small compared to the relaxation time. This time scale was observed to increase monotonically with increasing particle concentration due to the increase in $\rho$. The structure inferred from the rheological measurements is consistent with that determined by cryo-TEM studies of Helgeson et al. (M. E. Helgeson, T. K. Hodgdon, E. W. Kaler, N. J. Wagner, M. Vethamuthu, and K. P. Ananthapadmanabhan, Langmuir 26, 8049-8060 (2010)) for silica-WLM suspensions. Further, nonlinear rheological measurements in steady shear flow of the viscosity $\eta$ as function of the shear rate $\dot{\gamma}$ can be used to validate the relaxation time obtained from linear viscoelastic measurements. As shown in FIG. 15(b), under large deformations, $\eta$ decreased as a function of $\dot{\gamma}$ due to flow alignment and breakage of the network. Viscosity data could be described by the Carreau model (C. W. Macosko and R. G. Larson, *Rheology: Principles, Measurements, and Applications* (New York, U.S.: Wiley-VCH, 1994)) given by $\eta = \eta_0 [1+(\lambda_r\dot{\gamma})^2]^{(n-1)/2}$, where $\eta_0$ is the zero-shear rate viscosity and n is a fitting parameter<1. As seen from Table I, $\lambda_r$ values estimated from the linear and nonlinear viscoelastic data are practically identical. The three-fold increase in $\eta_0$ caused by the addition of 0.1 wt. % Ag nanoparticles is much greater than would be predicted by the Einstein equation for the viscosity of dilute suspensions. (A. Einstein, Ann. Phys., 19, 289-306 (1906)). This is further indication of the formation of micelle-nanoparticles junctions. Regarding FIG. 15(a) and FIG. 15(b), there is illustrated in FIG. 15(a) Linear viscoelastic spectrum of 100 mM CTAB and 200 mM NaNO$_3$ as a function of Ag NANOPARTICLEs weight fraction (Storage modulus, G', closed symbols and loss modulus, G", open symbols). Lines represent fits to the Maxwell model and in FIG. 15(b) there is illustrated steady state viscosity of a wormlike micellar solution of 100 mM CTAB and 200 mM NaNO$_3$ as a function of Ag nanoparticles weight fraction. Lines represent fits to the Carreau model.

TABLE I

Structural and Rheological Parameters of Ag-WLM PNGs

| Property | 0.00 wt. % | 0.01 wt. % | 0.05 wt. % | 0.10 wt. % |
|---|---|---|---|---|
| $\eta_0$ (Pa · s) | 1.32 | 1.36 | 1.70 | 3.47 |
| $\lambda_r$ (s, nonlinear) | 0.101 | 0.112 | 0.134 | 0.192 |
| $G_0$ (Pa) | 9.34 | 13.23 | 17.25 | 21.43 |
| $G_{min}''$ (Pa) | 3.58 | 4.61 | 4.77 | 5.10 |
| $\eta_\infty$ ($\times 10^3$ Pa · s) | 3.61 | 4.80 | 5.31 | 6.21 |
| $\rho$ ($\times 10^{21}$ m$^{-3}$) | 2.27 | 3.21 | 4.20 | 5.21 |

TABLE I-continued

Structural and Rheological Parameters of Ag-WLM PNGs

| Property | 0.00 wt. % | 0.01 wt. % | 0.05 wt. % | 0.10 wt. % |
|---|---|---|---|---|
| $\xi_M$ (nm) | 76 | 68 | 62 | 58 |
| $L_E$ (nm) | 156 | 128 | 111 | 101 |
| $\lambda_r$(s, linear) | 0.103 | 0.108 | 0.117 | 0.201 |
| $\lambda_{br}$ (s) | 0.021 | 0.023 | 0.024 | 0.025 |
| $\lambda_{rep}$ (s) | 0.522 | 0.534 | 0.719 | 1.402 |

The optical absorbance of PNGs was measured using a UV-VIS spectrometer (Ocean Optics, Inc., USB 4000). Gels with spherical Ag (Sigma-Aldrich Corp., polydisperse, average diameter $d_{avg} \approx 35$ nm), spherical Au (Nanopartz, Inc., monodisperse, $d_{avg}$ ranging from 30 to 90 nm) and/or rod-like Au (Nanopartz, Inc., monodisperse, $d_{avg} \approx 25$ nm, aspect ratio ranging from 1.4 to 3) nanoparticles were studied. The nanoparticle species were labeled with capital alphabets A-F as given in Table II along with the composition data for the nine samples (I-IX) reported in this Letter. Since the particle concentrations were relatively low, the absorbance increased linearly with increasing concentration. (C. F. Bohren, and D. R. Huffman, *Absorption and Scattering of Light by Small Particles* (Weinheim, Germany: Wiley-VCH, 2004).) Hence, the addition of multiple species of nanoparticles resulted in an absorbance spectrum which was a linear superposition of the individual spectra.

Figure 16A:
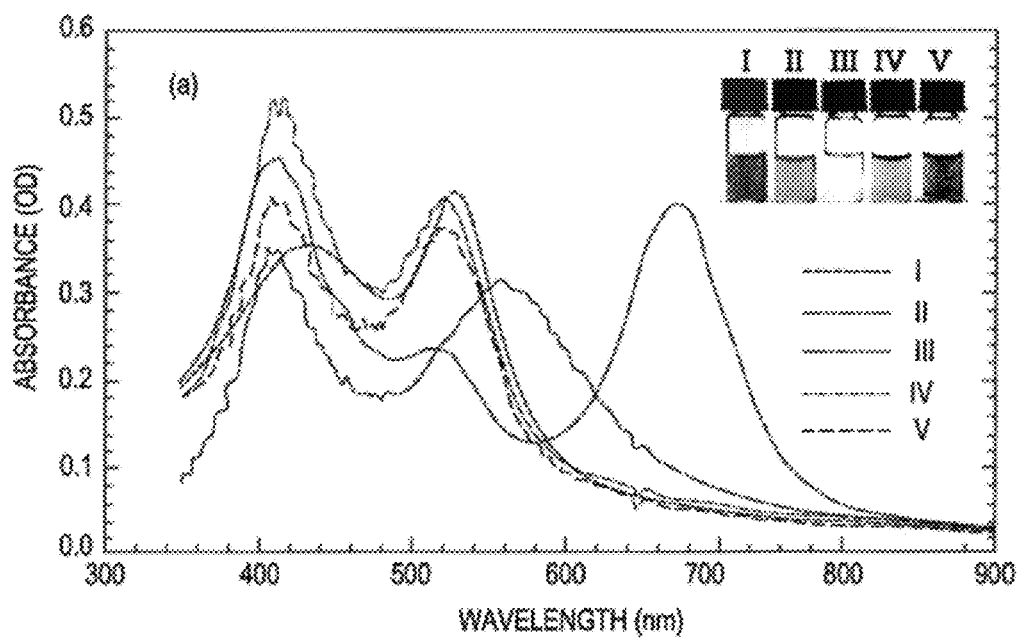
FIG. 16($a$) shows the absorbance spectra of five two-component samples (I-V)
Figure 16B:
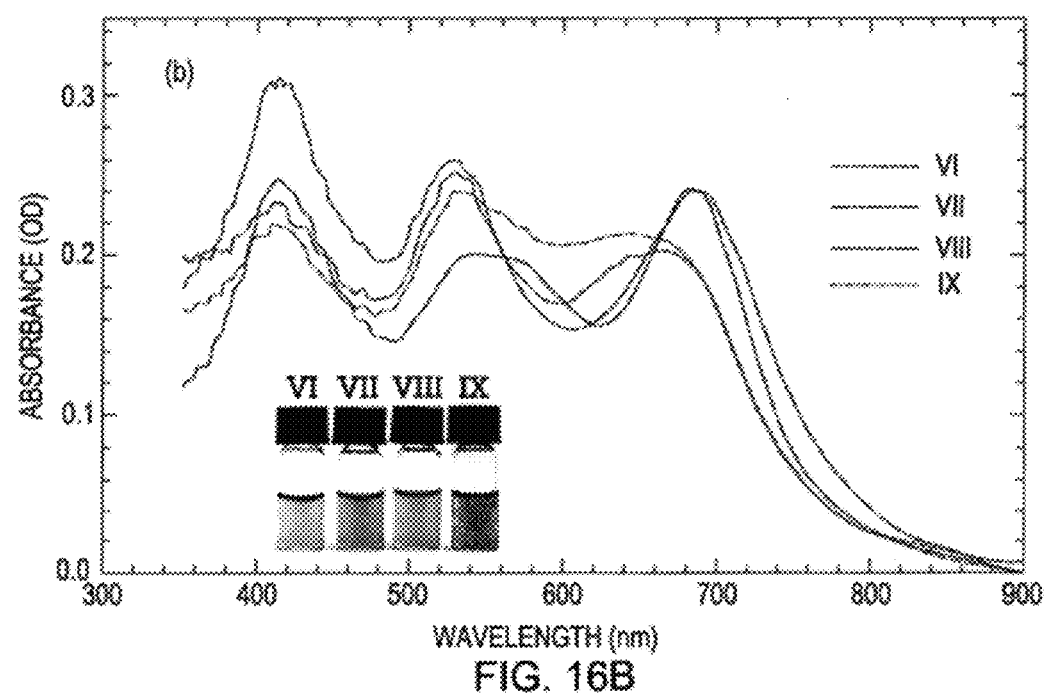

FIG. 16(a) shows the absorbance spectra of five two-component samples (I-V). Samples I (spherical and rod-like nanoparticles with a small aspect ratio), III, IV and V (multicomponent spherical nanoparticles) showed only two peaks in the spectra. Each peak corresponds to the radial plasmon resonance of the individual constituent. The longitudinal resonance peak coincides with the radial peak for particles with a small aspect ratio. (C. F. Bohren, and D. R. Huffman, *Absorption and Scattering of Light by Small Particles* (Weinheim, Germany: Wiley-VCH, 2004)). Absorption was also observed in the off-resonant regions in between the two peaks due to the superposition of the tails in the individual spectra. An additional peak appeared due to the longitudinal plasmon resonance in the large aspect ratio nanoparticles in sample II. However, in order to obtain a more uniform absorbance spectrum, samples (VI-IX) with three or more nanoparticle species were prepared (FIG. 16(b). Sample VI with equal amounts of constituents A-E showed three absorption peaks at ≈410 nm, ≈520 nm and ≈680 nm. The first two peaks were due to the radial plasmon resonance of species A-C, the third peak was attributed to the longitudinal plasmon resonance of species D and E. The peaks corresponding to the radial plasmon resonance of species D and E were small and diffuse in comparison. Hence, they contributed by increasing the overall absorbance in the 400-600 nm range. The ability to tune the spectrum was explored further by exploiting the following observations: (i). Varying the proportions of the nanoparticles impacted the uniformity of the spectra, e.g. samples VI and VII had the same total weight fraction, but increasing the concentration of high aspect ratio rod-like Au nanoparticles in sample VII led to a more uniform spectrum. (ii). Increasing the proportion of large diameter Au spherical nanoparticles (species C in sample VIII) led to the appearance of a broader red-shifted peak near 520 nm. (iii). The longitudinal plasmon resonance of high aspect ratio Au nanorods lies in the red region of the spectrum as evidenced by the higher absorbance of samples VI and IX in this region. Regarding FIGS. 16(a) and 16(b), FIGS. 16(a) and 16(b) illustrate plasmonic response spectrum of a multi-component system (refer to Table II for composition details).

There is demonstrated herein that multicomponent plasmonic nanogels with broadband absorption can be robustly synthesized by the self-assembly of metal nanoparticles with wormlike micelles in an aqueous solution. While we focused on the visible range of the solar spectrum, it is plausible to access the UV and/or IR regions by the suitable selection of the constituent species such as different metals and varying nanoparticle architectures. (J. M. Steele, N. K. Grady, P. Nordlander, and N. J. Halas, *Surface Plasmon Nanophotonics*, Chapter 13: *Plasmon Hybridization in Complex Nanostructures* (edited by M. L. Brongersma and P. G. Kik) (Dordrecht, Netherlands: Springer, 2007)). The self-assembly route described herein is a scalable room temperature process and does not rely on specific chemical interactions. Hence it is applicable to a variety of metals and shapes. Further, the gels have relatively low viscosity (~1 Pa·s), long shelf-life and thermal stability up to ≈80° C. At temperatures>80° C., the network melted resulting in a phase separated system consisting of a dense nanoparticle layer beneath a transparent surfactant solution. However, upon cooling to below 80° C. and vortex mixing, the PNGs were reformed suggesting that the phase transition is thermoreversible. Since the PNGs possess relatively low viscosity and low elasticity, they can be processed by well-established low cost techniques such as dip-/spin-coating onto or spraying over substrates to produce thin films and interfaces potentially suitable for applications ranging from light trapping in photovoltaic devices to molecular detection in environmental and biological systems. Further, PNGs could be used in optofluidic devices to develop reconfigurable plasmonic devices. (C. Monat, P. Domachuk and B. J. Eggleton, Nat. Photon. 1, 106-114 (2007); D. Psaltis, S. R. Quake and C. Yang, Nature 442, 381-386 (2006)).

TABLE II

Composition (in weight fractions) of multiple species (A through F) plasmonic gels. The WLM concentration is 100 mM for all samples. The diameter of spherical nanoparticles (S) is denoted by d while $d_{rod}$ and $\alpha$ represent the diameter and aspect ratio of rod-like nanoparticles (R).

| SAMPLE | A (Ag, S) d = 35 nm (ppm) | B (Au, S) d = 30 nm (ppm) | C (Au, S) d = 90 nm (ppm) | D (Au, R) $d_{rod}$ = 25 nm $\alpha$ = 2.3 (ppm) | E (Au, R) $d_{rod}$ = 25 nm $\alpha$ = 3.0 (ppm) | F (Au, R) $d_{rod}$ = 25 nm $\alpha$ = 1.4 (ppm) |
|---|---|---|---|---|---|---|
| I | 26.7 | — | — | — | — | 21.3 |
| II | 26.7 | — | — | — | 21.3 | — |
| III | 13.3 | — | 21.3 | — | — | — |
| IV | 26.7 | 21.3 | — | — | — | — |
| V | 13.3 | 21.3 | — | — | — | — |
| VI | 6.7 | 6.7 | 6.7 | 6.7 | 6.7 | — |
| VII | 3.3 | 6.7 | 6.7 | 3.3 | 13.3 | — |
| VIII | 6.7 | — | 13.3 | — | 13.3 | — |
| IX | 3.3 | 3.3 | 13.3 | 6.7 | 6.7 | — |

[End of Disclosure from Appendix A of U.S. Patent No. 61/454,392]

[Beginning of Disclosure from Appendix B of U.S. Patent No. 61/454,392]

Complex Fluids with Robustly Tunable Optical Properties: Experiments and Theory

Regarding an Abstract, metal nanoparticles possess unique optical and electronic properties. In this work, a new class of thermoreversible composite nanomaterials, referred to as plasmonic nanogels, were produced by the self-assembly of wormlike surfactant micelles and metal nanoparticles of Au and Ag in an aqueous solution at room temperature. The optical absorbance of such nanogels can be robustly tuned by varying the size, shape and concentration of the nanoparticles. In particular, we have produced stable multicomponent nanogels capable of broadband absorption in the visible spectral range. The gels were spin- or dip-coated onto Si and $SiO_2$ substrates to manufacture plasmonic interfaces that can be used for light trapping in photovoltaic devices. An effective medium theory was developed to predict the optical properties of such multicomponent nanocomposites.

Figure 17:
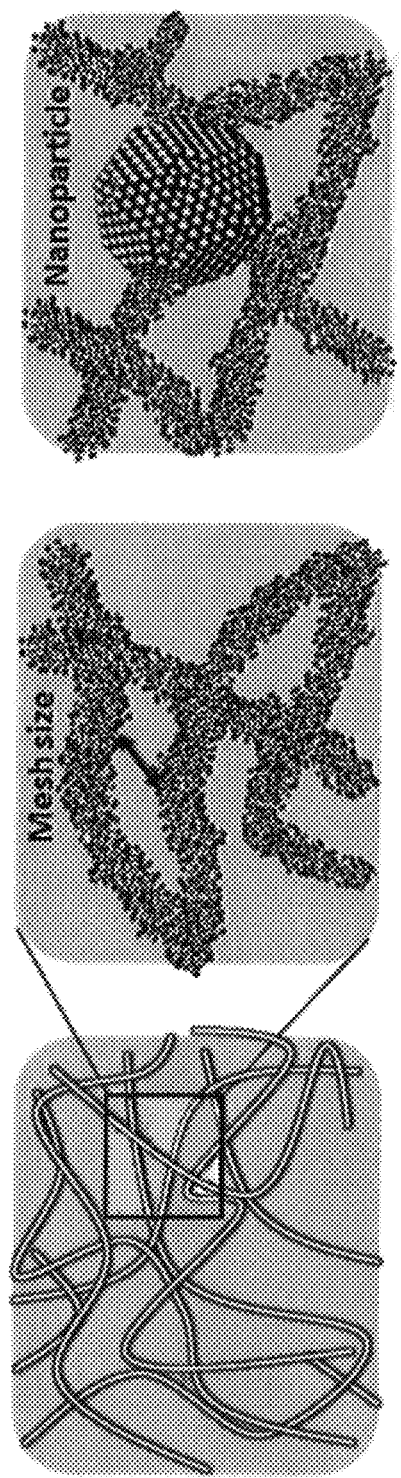
FIG. 17 is a graphical depiction of a nanoparticle network.

Introduction and methods wormlike micelles (WLMs) are elongated and semiflexible cylindrical aggregates formed by the self-assembly of amphiphilic surfactants in aqueous solutions. At sufficiently large concentrations, the micellar chains entangle to form a viscoelastic network with linear dimension on the order of $(k_b T/G_0)^{1/3}$, where $G_0$ is the plateau storage modulus and $k_b$ and T represent the Boltzmann constant and absolute temperature respectively. A method is depicted in FIG. 17.

Figure 18B:
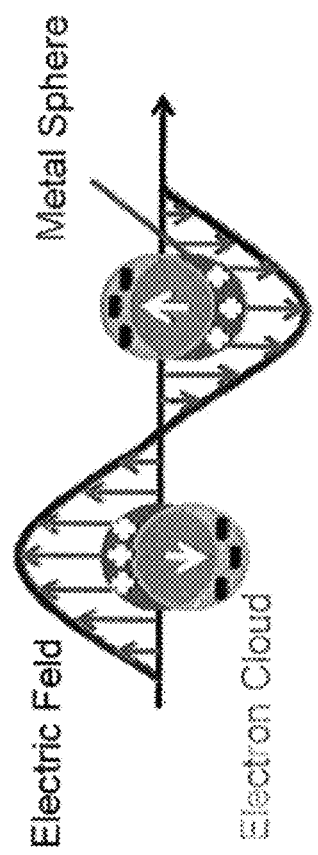
FIG. 18($a$) is a diagram depicting localized surface plasmon resonance phenomena.
Figure 18A:
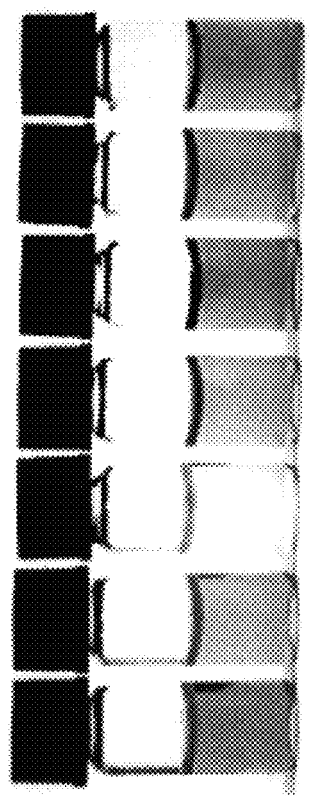

Resonant interactions between the oscillations of the conduction electrons on the metal nanoparticle surface and photons of specific wavelength results in strong absorption. This phenomenon, referred to as localized surface plasmon resonance (LSPR), is responsible for the unique absorption and scattering properties of plasmonic nanogels. Addition of plasmonic particles to an entangled WLM solution has been shown to influence the network structure through the formation of a double network of entanglements and NP-mediated junctions. Such networks can distribute the NPs in within the fluid in a stable and uniform fashion, as depicted in FIGS. 18(a) and 18(b). In FIG. 18(a) there is depicted localized surface plasmon resonance phenomena. In FIG. 18(b) there is depicted multicomponent plasmonic nanogels with tunable optical properties.

Regarding structure and rheology for certain samples are depicted FIG. 19(a) shows SAXS images of plasmonic gel with Ag nanoparticles ($R_{ave}$=17 nm). FIG. 19(b) shows SAXS images of plasmonic gel with spherical Au nanoparticles (R=15 nm).

Figure 20A:
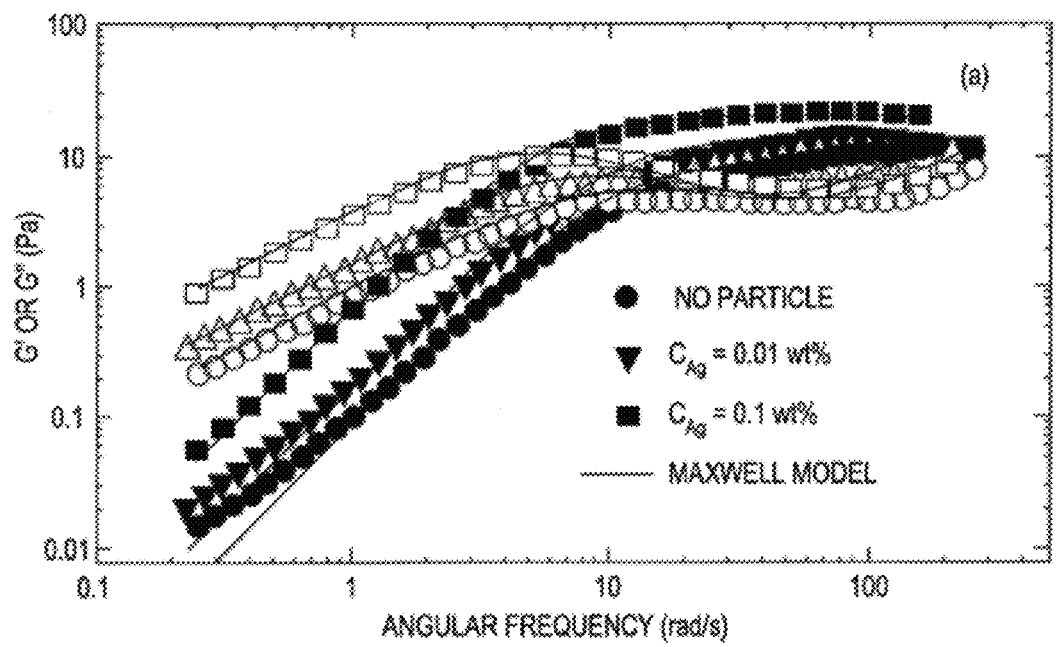
FIG. 20($a$) illustrates a linear viscoelastic spectrum of 100 mM CTAB and 200 mM $NaNO_3$ as a function of Ag NPs weight fraction (storage modulus, G', closed symbols and loss modulus, G", open symbols). Lines represent fits to the Maxwell model.
Figure 20B:
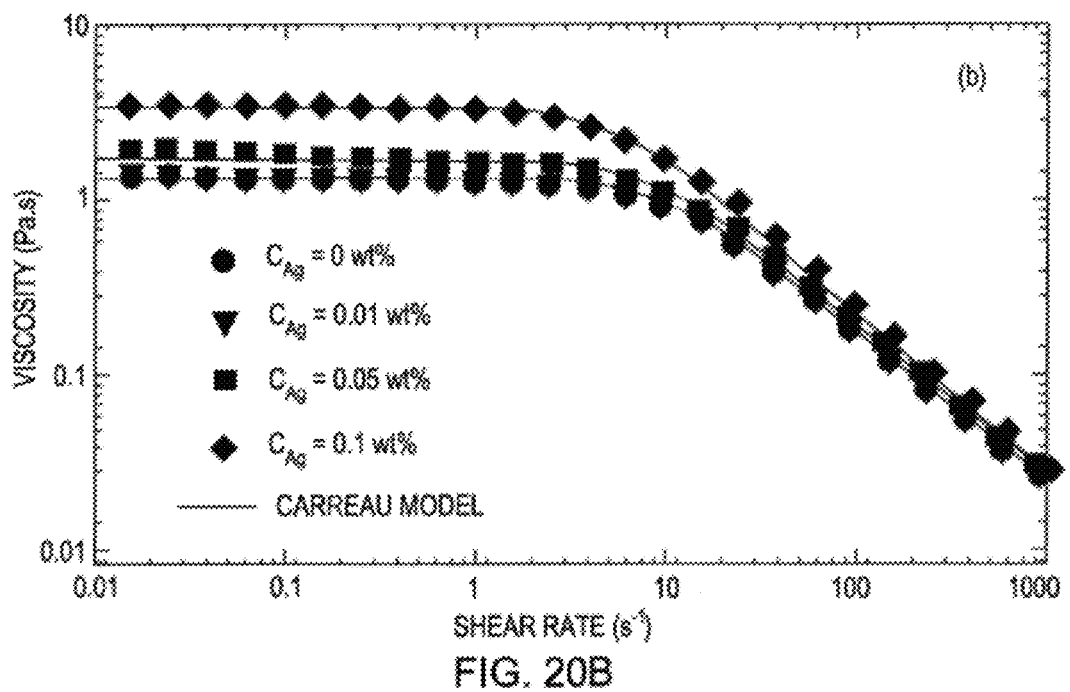

Regarding rheological experiments FIG. 20(a) illustrates a linear viscoelastic spectrum of 100 mM CTAB and 200 mM $NaNO_3$ as a function of Ag NPs weight fraction (storage modulus, G', closed symbols and loss modulus, G", open symbols). Lines represent fits to the Maxwell model. FIG. 20(b) illustrates steady state viscosity of a wormlike micellar solution of 100 mM CTAB and 200 mM $NaNO_3$ as a function of Ag NPs weight fraction. Lines represent fits to the Carreau model.

In Table III there is presented structural and rheological Parameters of various Ag-WLM nanogels.

TABLE III

| Property | 0.00 wt. % | 0.01 wt. % | 0.05 wt. % | 0.10 wt. % |
| --- | --- | --- | --- | --- |
| $\eta_0$ (Pa · s) | 1.32 | 1.36 | 1.70 | 3.47 |
| $\lambda$ (s. nonlinear) | 0.101 | 0.112 | 0.134 | 0.192 |
| $G_0$ (Pa) | 9.34 | 13.23 | 17.25 | 21.43 |
| $G_{min}"$ (Pa) | 3.58 | 4.61 | 4.77 | 5.10 |
| $\eta_\infty$ (×10$^3$) | 3.61 | 4.80 | 5.31 | 6.21 |
| $\rho$ (×10$^{21}$m$^{-3}$) | 2.27 | 3.21 | 4.20 | 5.21 |
| $\xi_M$ (nm) | 76 | 68 | 62 | 58 |
| $L_E$ (nm) | 156 | 128 | 111 | 101 |
| $\lambda_r$ (s. linear) | 0.103 | 0.108 | 0.117 | 0.201 |

The particle-particle distance gleaned from SAXS experiments and the mesh size estimated from rheological data were qualitatively consistent. Upon adding nanoparticles, the mesh size of the network reduced from 76 nm (no NPs) to 58 nm (0.1 wt % NPs).

Optical Properties

Figure 21A:
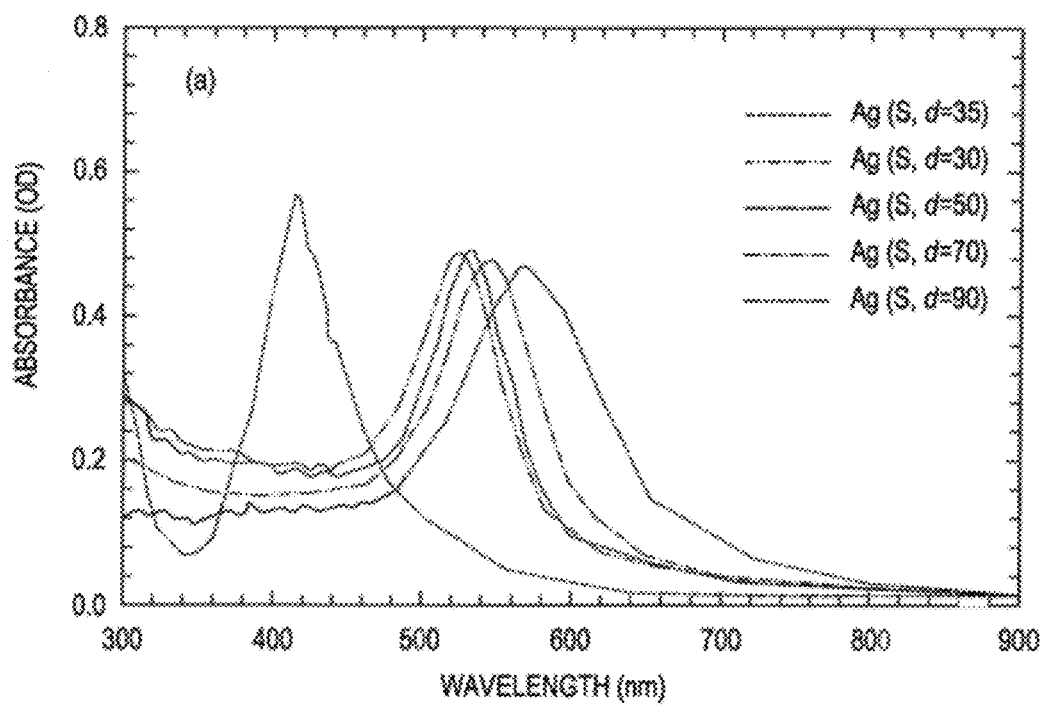
FIG. 21($a$) illustrates plasmonic response of spherical Au and Ag NPs of various diameters (d)
Figure 21B:
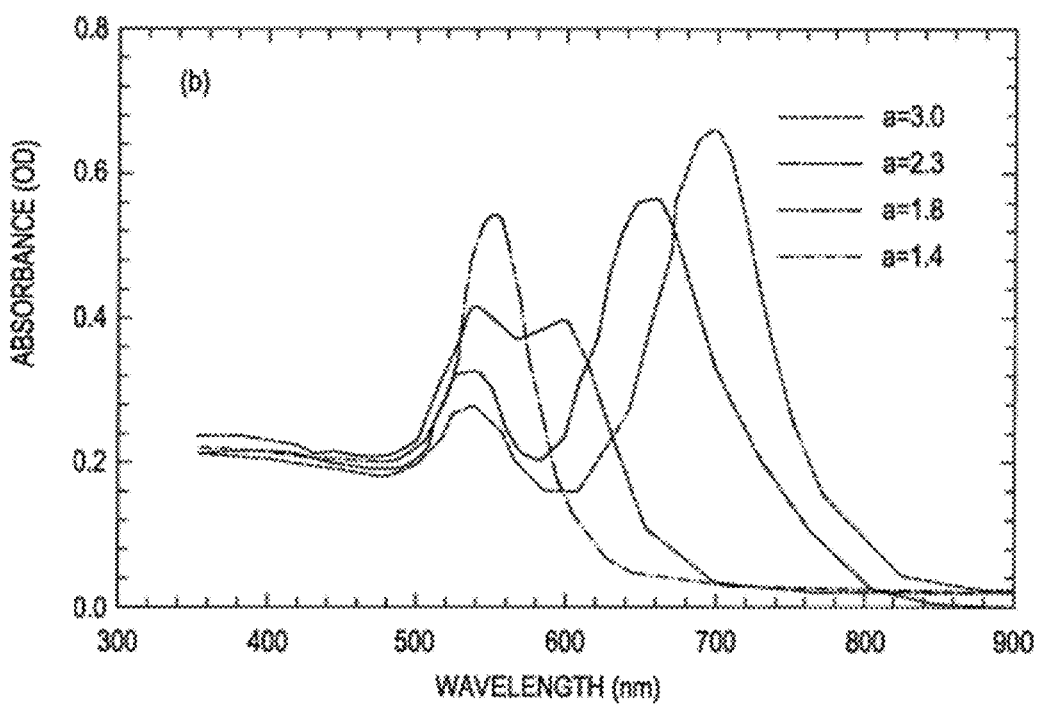

As indicated in the wavelength to absorbance plots of FIGS. 21(a) and 21(b) the size and shape of plasmonic nanoparticles (NPs) can be changed to tune the optical absorbance. FIG. 21(a) illustrates plasmonic response of spherical Au and Ag NPs of various diameters (d). FIG. 21(b) illustrates plasmonic response of rodlike Au NPs ($d_{rod}$=25 nm) of various aspect ratios ($\alpha$).

Figure 22A:
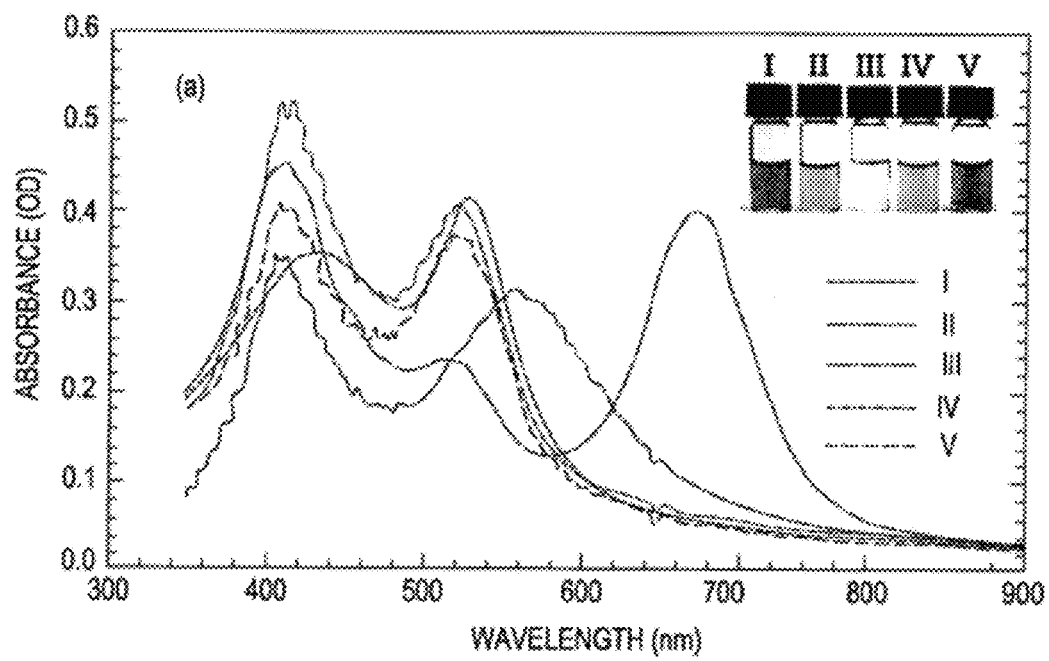
FIGS. 22($a$) and 22($b$) illustrate plasmonic response spectra of multicomponent systems (refer to Table IV for composition details). Nanogels capable of broadband absorption were synthesized.
Figure 22B:
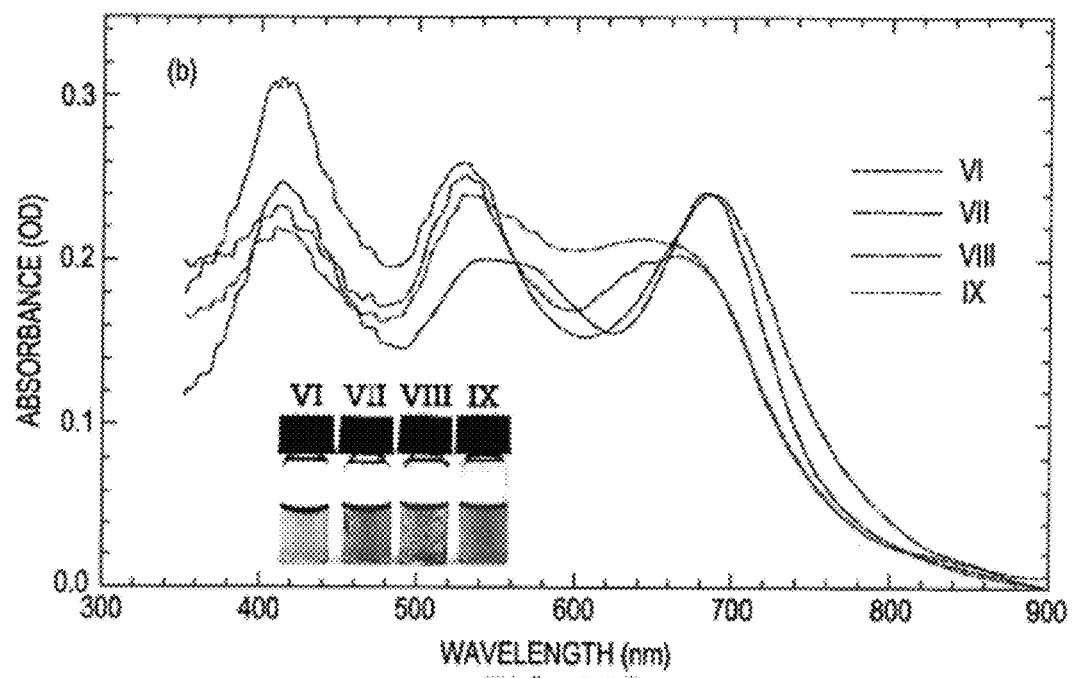

FIGS. 22(a) and 22(b) illustrate plasmonic response spectra of multicomponent systems (refer to Table IV for composition details). Nanogels capable of broadband absorption were synthesized.

Table IV presents parameters for various samples. Composition (in weight fractions) of multiple species (A through F) plasmonic nanogels. The WLM concentration is 100 mM for all samples. The diameter of spherical NPs (S) is denoted by d while $d_{rod}$ and $\alpha$ represent the diameter and aspect ratio of rod-like NPs (R).

TABLE IV

| SAMPLE | A (Ag, S) d = 35 nm (ppm) | B (Au, S) d = 30 nm (ppm) | C (Au, S) d = 90 nm (ppm) | D (Au, R) $d_{rod}$ = 25 nm $\alpha$ = 2.3 (ppm) | E (Au, R) $d_{rod}$ = 25 nm $\alpha$ = 3.0 (ppm) | F (Au, R) $d_{rod}$ = 25 nm $\alpha$ = 1.4 (ppm) |
| --- | --- | --- | --- | --- | --- | --- |
| I | 26.7 | — | — | — | — | 21.3 |
| II | 26.7 | — | — | — | 21.3 | — |
| III | 13.3 | — | 21.3 | — | — | — |
| IV | 26.7 | 21.3 | — | — | — | — |
| V | 13.3 | 21.3 | — | — | — | — |
| VI | 6.7 | 6.7 | 6.7 | 6.7 | 6.7 | — |
| VII | 3.3 | 6.7 | 6.7 | 3.3 | 13.3 | — |
| VIII | 6.7 | — | 13.3 | — | 13.3 | — |
| IX | 3.3 | 3.3 | 13.3 | 6.7 | 6.7 | — |

Figure 23:
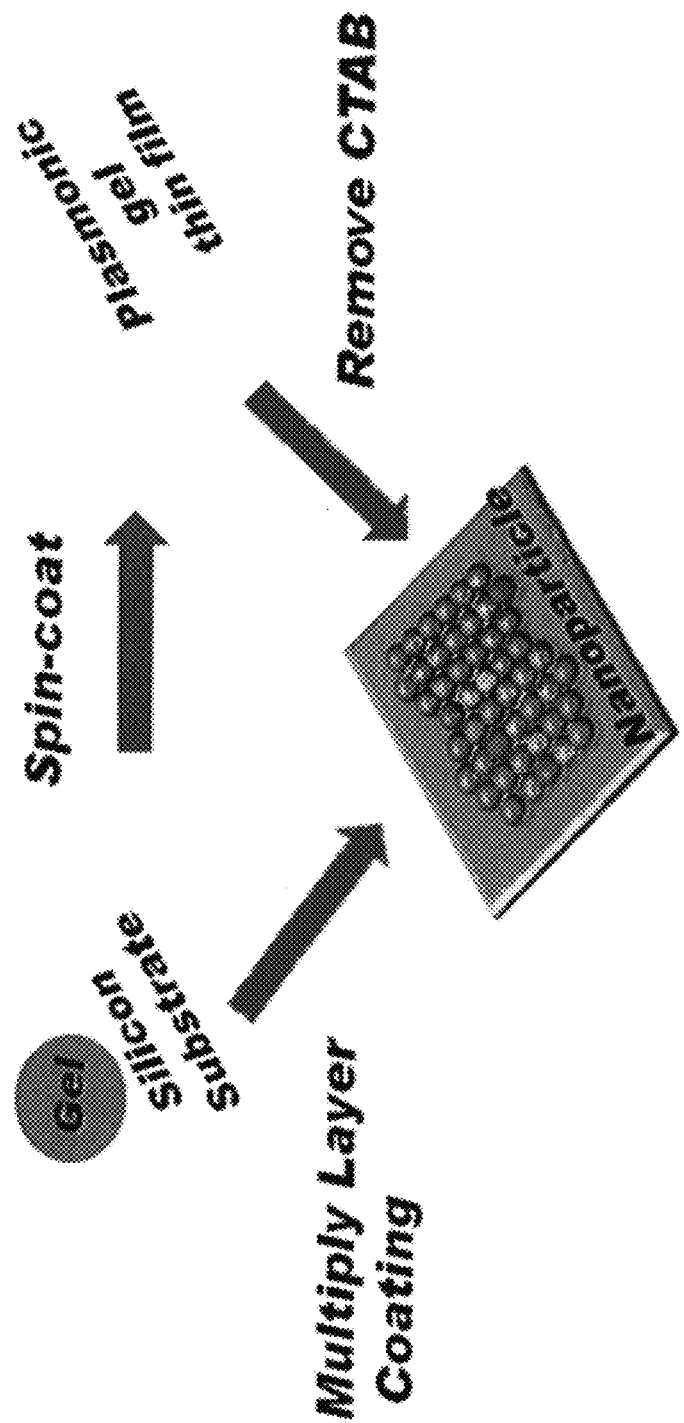
FIG. 23 presents a schematic overview of a spin coating method.

FIG. 23 presents a schematic overview of a spin coating method.

FIG. 24(a) is a SEM photograph of 1 wt % Ag ($R_{ave}$=17 nm) plasmonic gel coating on silicon. FIG. 24(b) is a SEM photograph of multicomponent plasmonic gel coating on silicon. FIG. 24(c) is a SEM photograph of 0.1 wt % Au ($R_{ave}$=7 nm) plasmonic gel coating on silicon.

Figure 25:
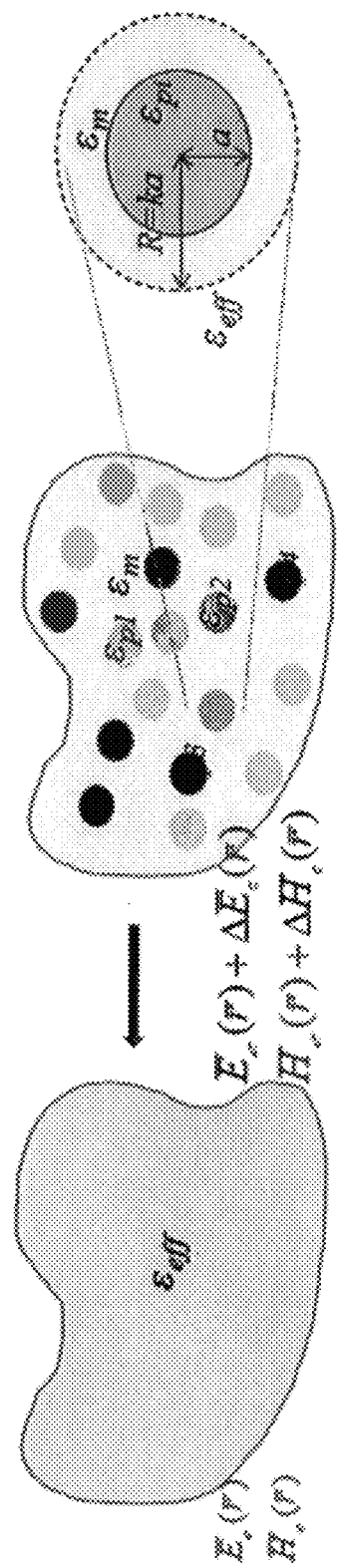
FIG. 25 is a schematic diagram illustrating an effective medium theory.
Figure 25A:
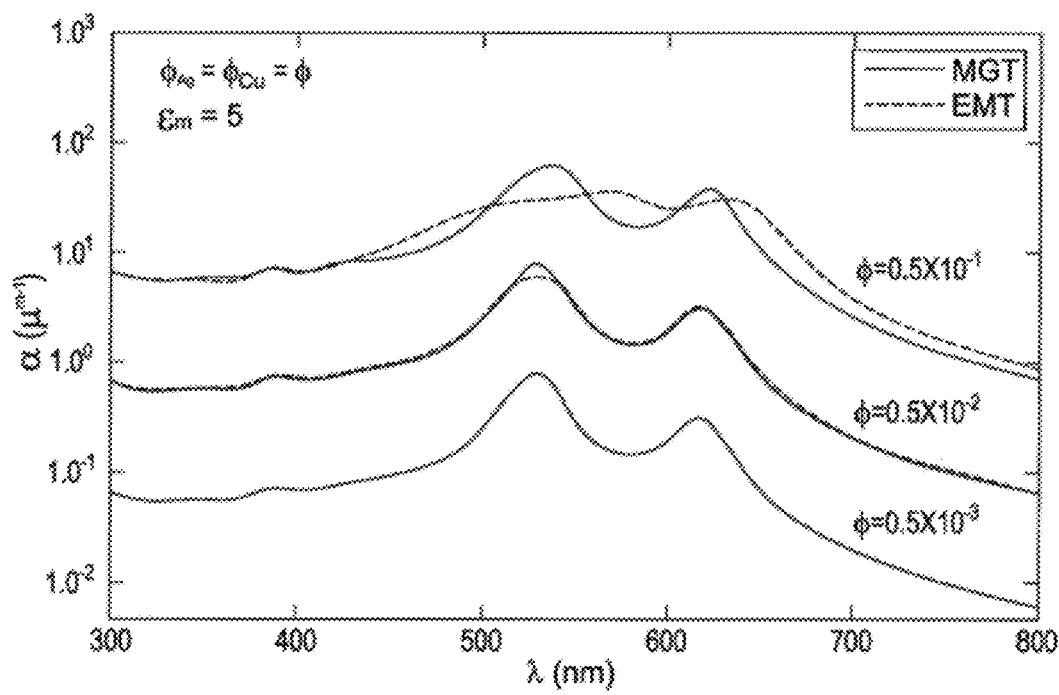
Figure 25B:
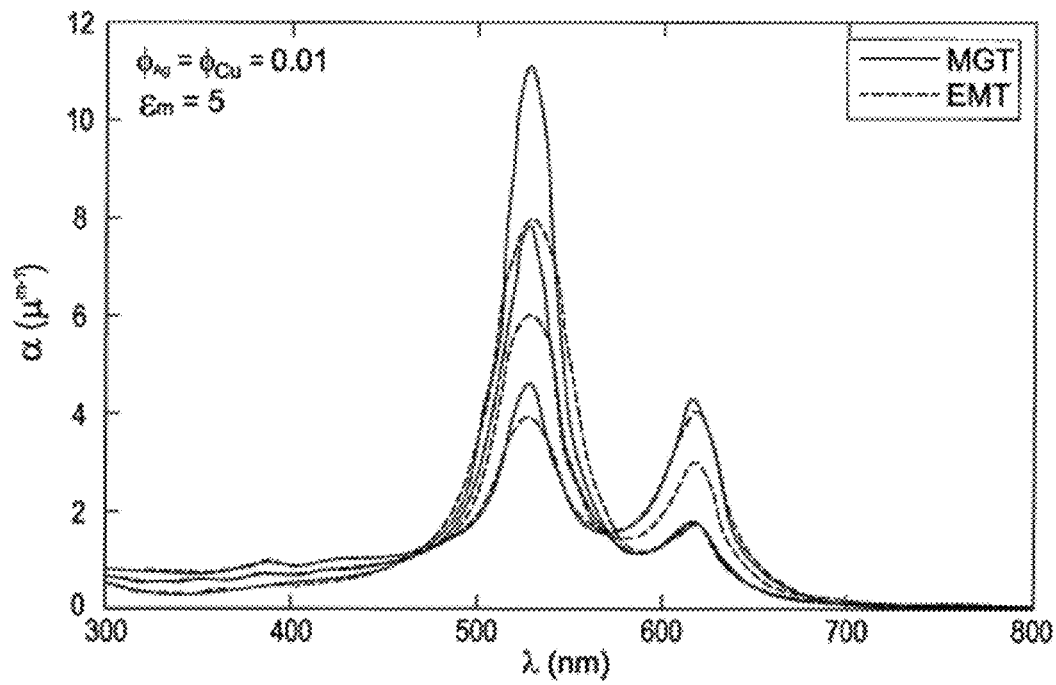
Figure 25C:
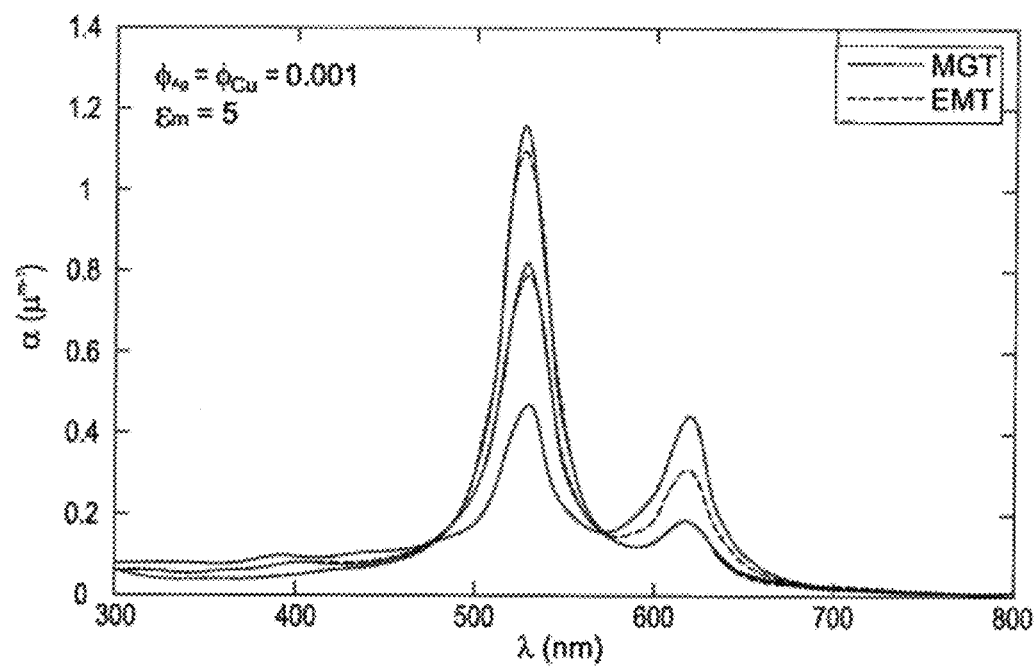
Figure 25D:
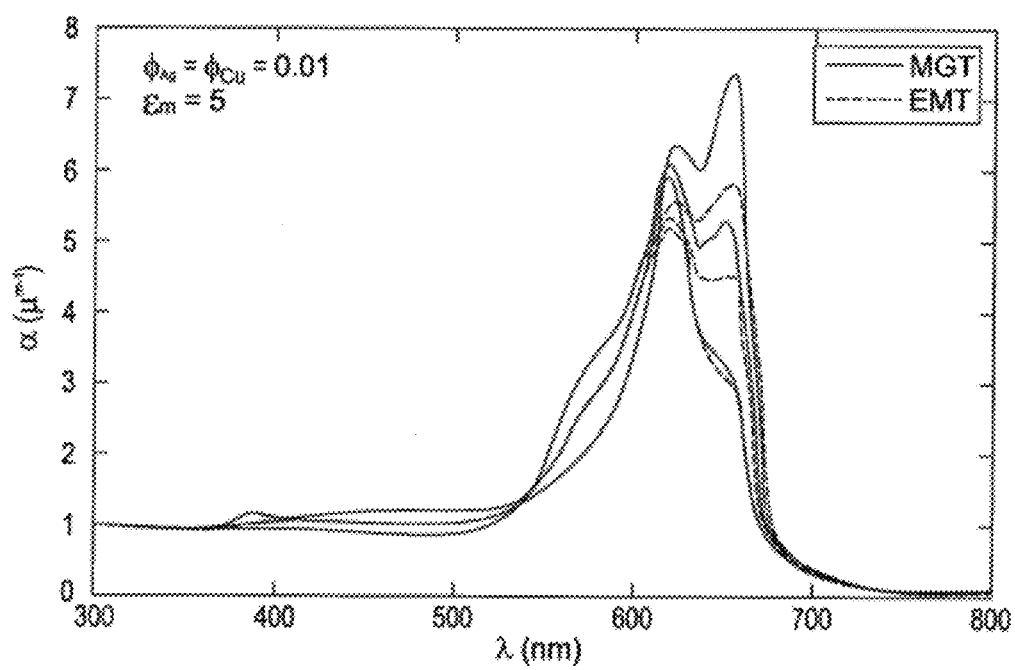
Figure 25E:
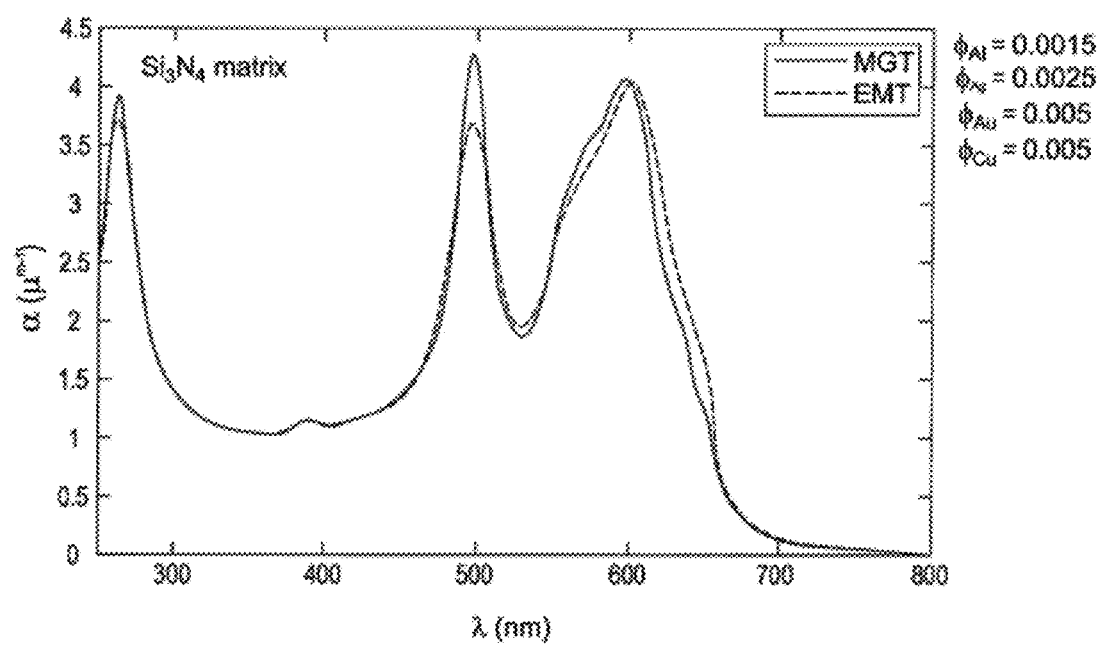
Figure 26A:
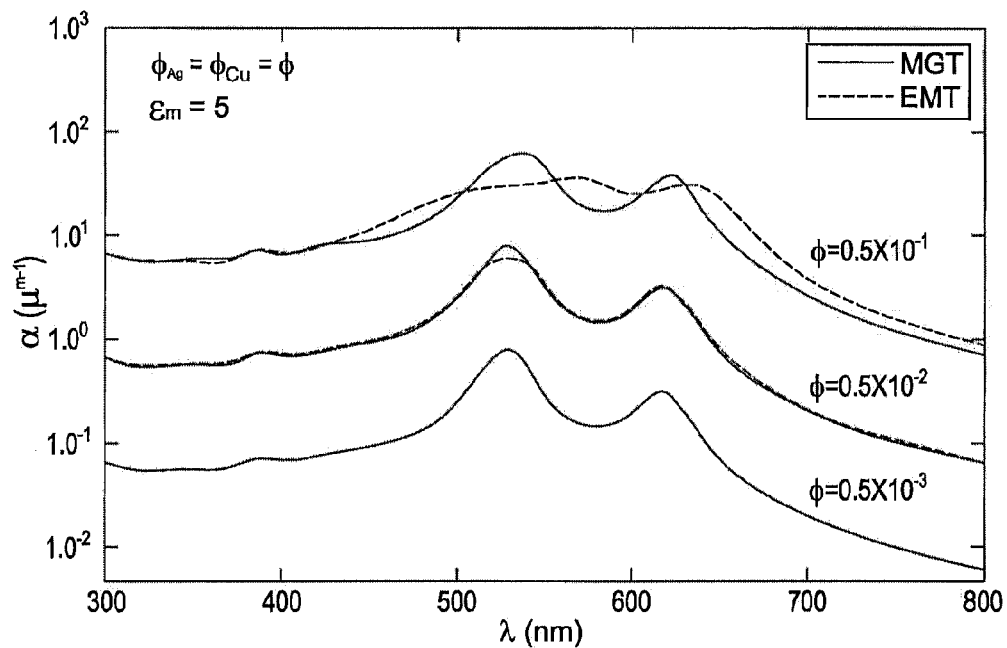
FIGS. 26($a$)-($d$) illustrate effective medium Theory for (k→0)
Figure 26B:
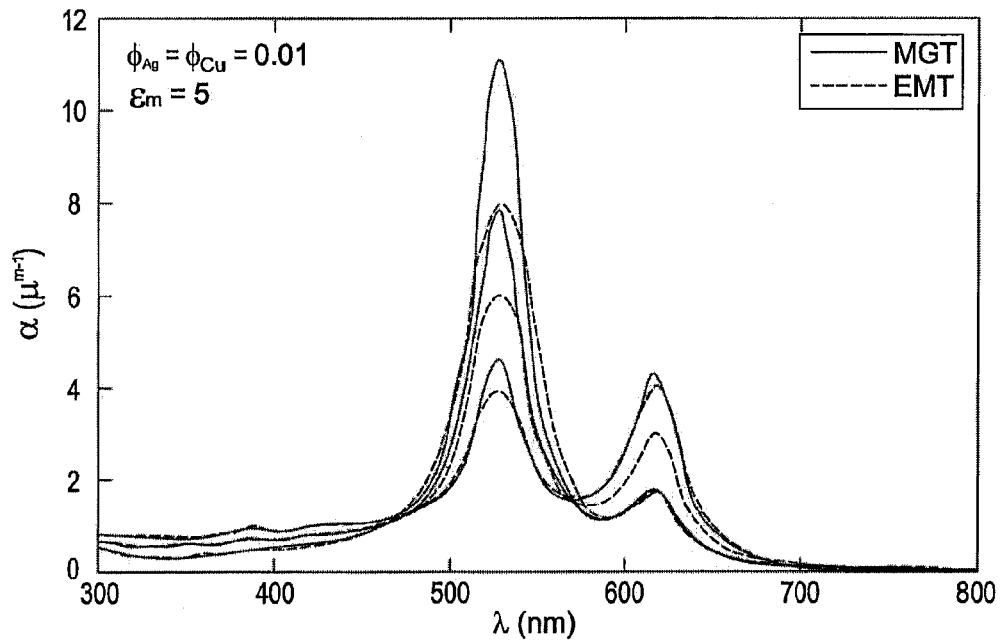
Figure 26C:
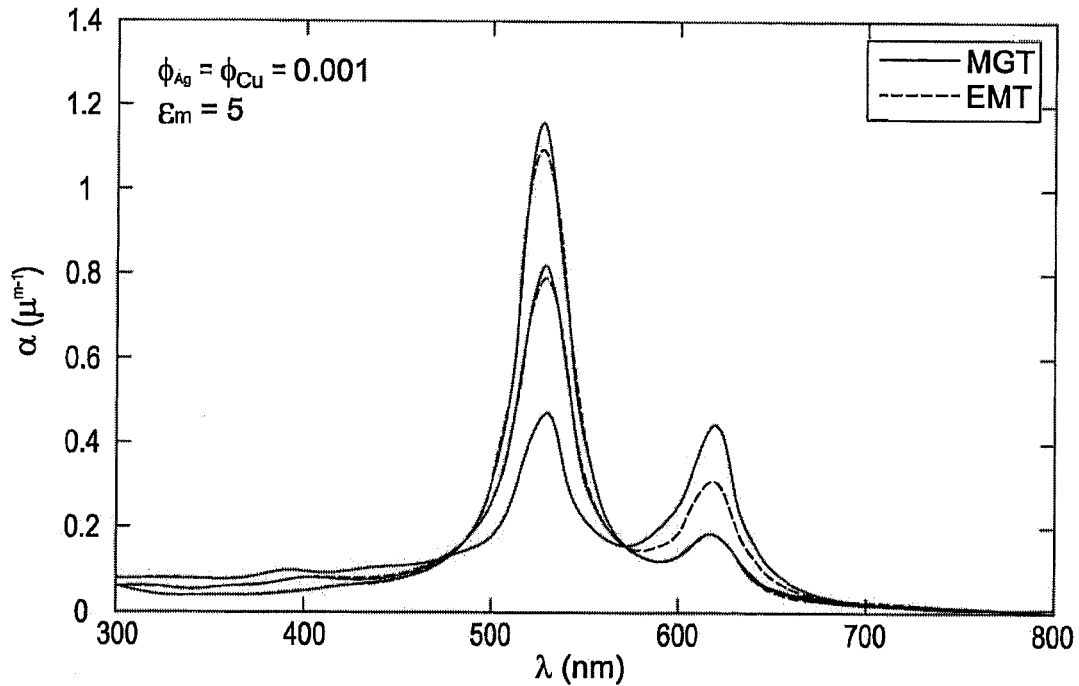
Figure 26D:
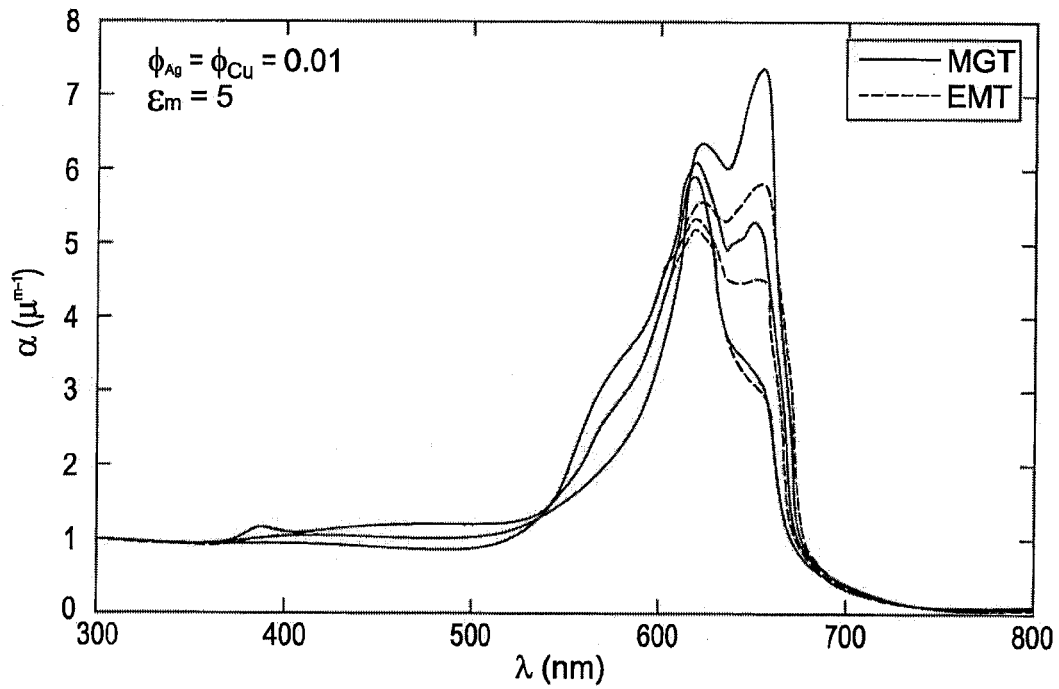

FIG. 25 is a schematic diagram illustrating an effective medium theory.

An effective medium corresponding to a multi-component composite is defined here to have the following properties: the presence of in homogeneties in the composite medium leads to the propagation a spatially perturbed electromagnetic wave.

$$\overline{E}_C(\overline{r}) = \overline{E}_{eff}(\overline{r}) + \Delta \overline{E}_C(\overline{r}) \quad \overline{E}_{eff}(\overline{r}) = \langle \overline{E}_0 \rangle \exp(i\overline{k}_{eff}\cdot\overline{r}) \quad |\langle \overline{H} \rangle = ($$
$$\sqrt{\epsilon_{eff}/\mu_0})|\overline{E}_0\rangle \quad \langle D \rangle = \epsilon_{eff}\langle E \rangle$$

$$\overline{H}_C(\overline{r}) = \overline{H}_{eff}(\overline{r}) + \Delta \overline{H}_C(\overline{r}) \quad \overline{H}_{eff}(\overline{r}) = \langle \overline{H}_0 \rangle \exp(i\overline{k}_{eff}\cdot\overline{r})$$
$$k_{eff}^2 = \omega^2\mu_0\epsilon_{eff}\langle \overline{B} \rangle = \mu_0\langle \overline{H} \rangle$$

In the effective medium, only an ensemble averaged wave propagates.

The effective medium is spatially homogenous for the averaged wave.

The constitutive relations for the effective medium relate the ensemble averaged fields.

The averaged field inside a particle of type i is that of the same particle embedded in the effective medium. However, the effective medium begins only after a radius R=ka, where a is the radius of each particle.

The parameter k is chosen such that excess specific volume of addition of hard sphere particles to a suspension $V_{ex}=(4/3)(8-k^3)a^3$. This means that the excess volume after homogenizing the external medium is accounted for by making k<2.

The Carnahan-Starling approximation is used to estimate k from the static structure factor S(0).

$$k(\phi) = \left(\frac{1-S(0)}{\phi}\right)^{\frac{1}{3}},$$

$$S(0) = \frac{(1-\phi)^4}{1+4\phi+4\phi^2-4\phi^3+\phi^4},$$

$$\Gamma_i \phi_i \langle E \rangle = \langle g_i \bar{E}_i \rangle,$$

$$\langle g_i \bar{E}_i \rangle = \int_{particle} \langle \bar{E}_i \rangle (r|r_1) P(r_1) dr,$$

$$\varepsilon_{eff} = \varepsilon_m + \sum_{i=1}^{n} (\varepsilon_i - \varepsilon_m)\Gamma_i \phi_i.$$

The averaged field inside the particles is linearly related to the averaged field in the effective medium. The proportionality constants $\Gamma_i$ depend on the type of the particle.

Figure 27:
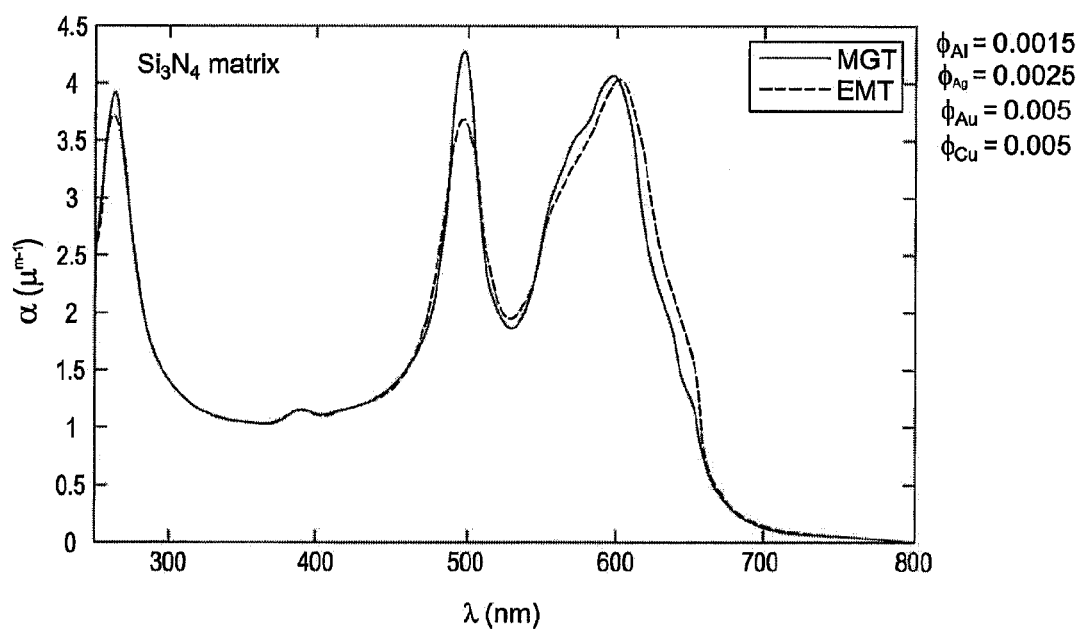
FIG. 27 illustrates broadband absorption in multiple component system.

Regarding FIGS. 26(a)-(e), FIGS. 26(a)-(e) illustrate effective Medium Theory for (k→0). Regarding FIG. 27, FIG. 27 illustrates broadband absorption in multiple component system.

Regarding conclusions wherein, plasmonic nanogels with robustly tunable optical properties were synthesized by the self-assembly of metal nanoparticles with wormlike micelles in an aqueous solution. Further, SAXS and rheological experiments suggested the formation of nanoparticle-micelle junctions. Further, the gels have relatively low viscosity, long shelf life and thermal stability. They are thermoreversible and easily processable. Further, the gels were spin coated onto Si and SiO$_2$ substrate to produce plasmonic interfaces potentially suitable for light trapping in photovoltaic devices. Further, an effective medium theory was developed to predict the optical properties of multicomponent nanocomposites.

[End of Disclosure from Appendix B of U.S. Patent No. 61/454,392]

Figure 6:
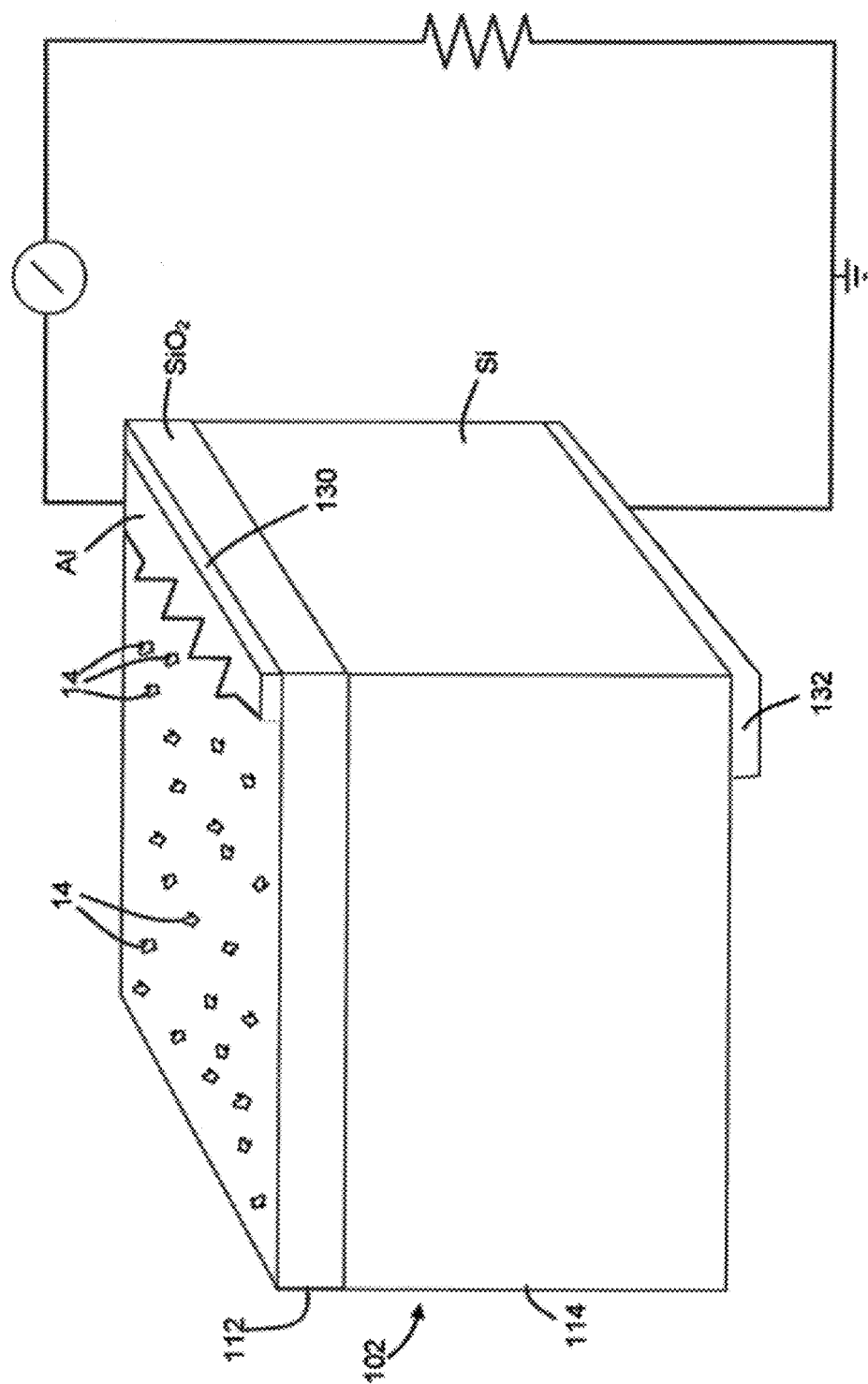
FIG. 6 is a diagram of solar cell.
Figure 28:
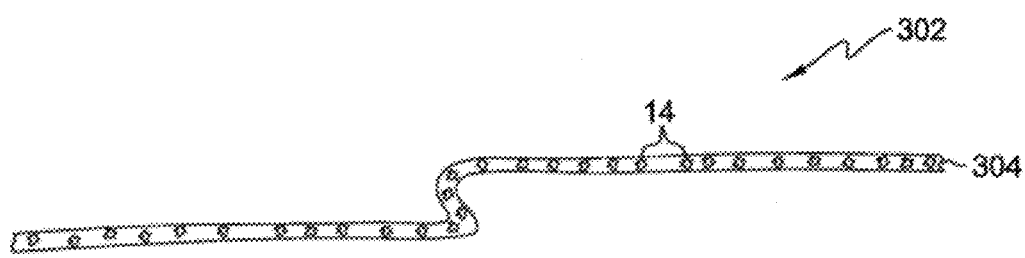
FIG. 28 is a cross sectional schematic illustration of a single layer light transmissive structural body having an array of nanoparticles.

In one embodiment, e.g., the embodiment of FIG. 6, in which an array of nanoparticles is integrated into an area of a Si/SiO2 wafer, a structural body into which an array of nanoparticles 14 can be integrated can be a rigid structural member. In one embodiment, a structural body into which an array of nanoparticles 14 can be integrated can be a flexible structural body. Examples of flexible structural bodies include structural bodies formed of polydimethylsidoxane (PDMS) and polyvinyl alcohol (PVA). An example of a flexible structural body into which an array of nanoparticles 14 can be integrated is shown in FIG. 28. In the example of FIG. 28 an apparatus provided by a flexible structural body 302 includes a layer 304 of polydimethylsidoxane (PDMS) having an array of nanoparticles 14 integrated into an area therein, the array of nanoparticles integrated by a method set forth herein, e.g., by spin coating, dipping or spraying using a gel comprising a fluid and a nanoparticle network disposed in the fluid, the nanoparticle network comprising nanoparticles combined with surfactant micelle chains. In one embodiment an array of nanoparticles 14 can be uniformly integrated over an entire surface area of layer 304, e.g., its top surface as well as its bottom, side and edge surfaces, e.g., by spin coating, dipping or spraying. Array of nanoparticles 14 can be uniformly integrated in an area of layer 304 with use of a gel 11 as set forth herein. Layer 304 provided by polydimethylsidoxane (PDMS) can be substituted for by another material, e.g., polyvinyl alcohol (PVA).

Figure 29:
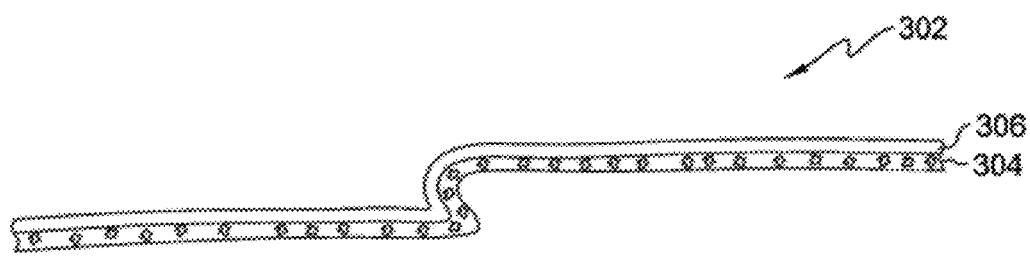
FIG. 29 is a cross sectional schematic illustration of a two layer light transmissive structural body having an array of nanoparticles.
Figure 30:
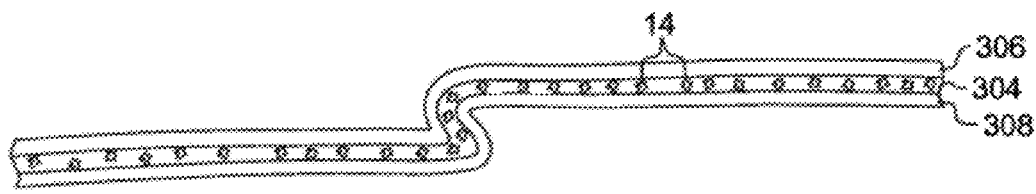
FIG. 30 is a cross sectional schematic illustration of a three layer light transmissive structural body having an array of nanoparticles.

In the example of FIG. 29 a flexible structural body 302 having an array of nanoparticles 14 has a plurality of layers, namely flexible layer 304 having an array of nanoparticles 14, and flexible layer 306. Flexible layer 306 can be without an array of nanoparticles 14 or can include a reduced concentration of nanoparticles 14. Flexible layer 306 can be adhered to layer 304 with use of an adhesive. Flexible layer 306 can provide mechanical protection to layer 304 so that absorbance properties of layer 304 are less likely to be affected by mechanical contact of layer 304 to an external structural member. Flexible layer 306 can also prevent contact of nanoparticles 14 with external objects. In the example of FIG. 30 a flexible structural body 302 having an array of nanoparticles 14 has a plurality of layers, namely flexible layer 304 having an array of nanoparticles 14 integrated into an area therein, and flexible layer 306 adjacent to a first side of layer 304 and a flexible layer 308 adjacent to a second side of layer 304. Flexible layers 306 and 308 can be without an array of nanoparticles 14 or can include a reduced concentration of nanoparticles 14. Flexible layers 306 and 308 can provide mechanical protection to layer 304 so that absorbance properties of layer 304 are less likely to be altered by mechanical contact of layer 304 to an external structural member. Flexible layers 306 and 308 can also prevent contact of nanoparticles 14 with external objects. With reference to FIGS. 29 and 30, layer 304 provided by polydimethylsidoxane (PDMS) can be substituted for by, e.g., polyvinyl alcohol (PVA), layer 306 provided by polydimethylsidoxane (PDMS) can be substituted for by, e.g., polyvinyl alcohol (PVA), and layer 308 provided by polydimethylsidoxane (PDMS) can be substituted for by, e.g. polyvinyl alcohol (PVA). In the embodiments of FIGS. 28-30 nanoparticles 14 can be uniformly distributed in an area of layer 304 so that layer 304 exhibits broad band light absorbance qualities. In one embodiment layer 304 can comprise a uniformly distributed array of nanoparticles 14 having the species in the concentrations depicted in samples XI, XII or IX as shown in Table II. Layers 304, 306 and 308 can be regarded as thin films.

Flexible structural bodies having integrated arrays of nanoparticles 14 provide significant advantages. Flexible structural bodies are substantially impervious to damage caused by mechanical stresses including thermally induced mechanical stresses.

Figure 31:
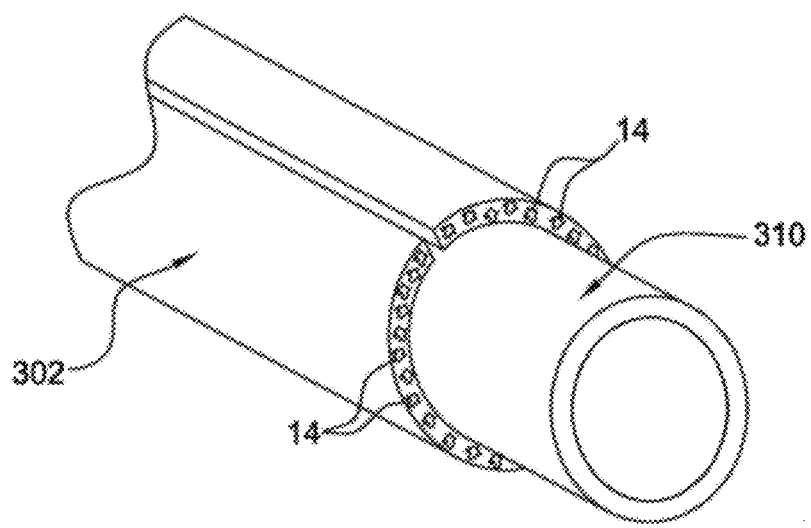
FIG. 31 is a perspective schematic illustration of a fluid pipe having disposed therabout a flexible structural body having an array of nanoparticles.

An apparatus provided by a flexible structural body 302 having an integrated array of nanoparticles 14 provides significant advantages in terms of installation. A flexible structural body 302 having an integrated array of nanoparticles 14 as set forth herein can be installed in association of an expanded range of structural members. A flexible structural body 302 having an array of nanoparticles 14 can be wrapped around in abutting relation to a fluid pipe 310 as shown in FIG. 31. Fluid pipe 310 can carry fluid in an internal environment (within a building) or an external environment outside of a building where it is exposed to sunlight. The providing of structural body 302 about fluid pipe 310 provides heating of fluid pipe 310. In all of the embodiments herein including an array of nanoparticles 14 the nanoparticles can be uniformly distributed in the area in which they are distributed.

A structural body as set forth herein having an array of nanoparticles 14 can be light transmissive. Providing a light transmissive structural body having an integrated array of nanoparticles 14 provides significant advantages and the technical effect of combined light transmissivity and heat absorbance. In one embodiment a light transmissive structural body can be utilized in association with a window, e.g., a building or vehicle window in applications where light transmissivity is needed. Nanoparticles 14 can have dimensions of orders of magnitude smaller than visible light wavelengths. Accordingly, visual optical properties of a structural body having nanoparticles 14 are not expected to be effected by a presence of nanoparticles 14. Examples of light transmissive structural bodies include structural bodies formed of polydimethylsidoxane (PDMS) and polyvinyl alcohol (PVA) as described in connection with FIGS. 28-30. Light transmissive structural bodies formed of polydimethylsidoxane (PDMS) and polyvinyl alcohol (PVA) as described in connection with FIGS. 28-30 can be flexible light transmissive structural bodies.

In FIG. 32 there is shown a building window 352 having an associated structural body 302 including an array of nanoparticles 14 as set forth herein. Flexible light transmissive structural body 302 can be of one of the one or multilayer structural bodies as set forth in FIGS. 27, 28, and 29. In the embodiment of FIG. 32 structural body 302 is disposed adjacent to building window 352 and is provided on a roller 356 so as to be moveable between a first state in which the structural body 302 is adjacent window 352 and a second state in which structural body 302 is not adjacent window 352. Window 352 can be formed of glass. Structural body 302 can be manually moved into the first state during periods of relatively colder external temperatures for purposes of heat trapping and thermal heating of a building interior and can be manually moved into the second state during periods of relatively warmer external temperatures. In the view of FIG. 32 structural body 302 is positioned in an intermediate state such that a part of window 352 has structural body 302 adjacent thereto and a part of window 402 does not have structural body 302 adjacent thereto. Structural body 302 in association with a vehicle window or building window as shown in FIG. 32 can be adapted so that an area of coverage of by the structural body 302 relative to window 352 can be manually adjusted. In FIG. 33, there is shown a vehicle window 352 having an adjacently disposed structural body 302 wherein the structural body includes an array of nanoparticles 14. With structural body 302 fixed to vehicle window 352, structural body 302 can be regarded as being part of window 352. Window 352 in one embodiment can comprise a unitary sheet of glass. Structural body 302 in one embodiment can comprise a unitary thin film consisting of, e.g., polydimethylsidoxane (PDMS) and polyvinyl alcohol (PVA). The presence of light transmissive structural body 302 adjacent window 352 can prevent or reduce frost and ice buildup on window 352. FIG. 34 shows a cross sectional view taken along line A-A of FIG. 33. In alternatives to the embodiments of FIGS. 32 and 33, an array of nanoparticles 14 can be integrated into window 352, e.g., by spin coating or dipping. Window 352 in one embodiment can comprise glass.

In one embodiment of a photovoltaic apparatus as set forth in FIG. 6, a structural body into which an array of nanoparticles 14 can be integrated can be a rigid Si/$SiO_2$ wafer with nanoparticles integrated into an area of $SiO_2$ layer 112. In another embodiment, a flexible structural body having an array of nanoparticles 14 can be integrated into a flexible photovoltaic apparatus. Examples of flexible structural bodies include structural bodies formed of polydimethylsidoxane (PDMS) and polyvinyl alcohol (PVA). In FIG. 35 there is depicted a flexible photovoltaic apparatus 378 having a flexible structural body 302 including an array of distributed nanoparticles 14. Flexible structural body 302 can be a flexible structural body as depicted in FIG. 28, 29 or 30. Photovoltaic apparatus 378 can include one or more layer 382 defining a PN junction and electrodes 130, 132. Flexible structural body 302 can be disposed adjacent an active light sensitive surface of flexible photovoltaic apparatus 378 in order to increase a light energy collection of photovoltaic apparatus 378. Flexible structural bodies having integrated arrays of nanoparticles 14 are substantially impervious to mechanical stresses including thermally induced mechanical stresses. For photovoltaic applications, flexible photovoltaic apparatus facilitate installation in association with a greatly expanded variety of structural members including curved structural members, e.g., cylinders including vertically extending poles, and spherical structural members. Flexible structural bodies are also substantially impervious to damage resulting from thermal stresses (including self heating).

Figure 36:
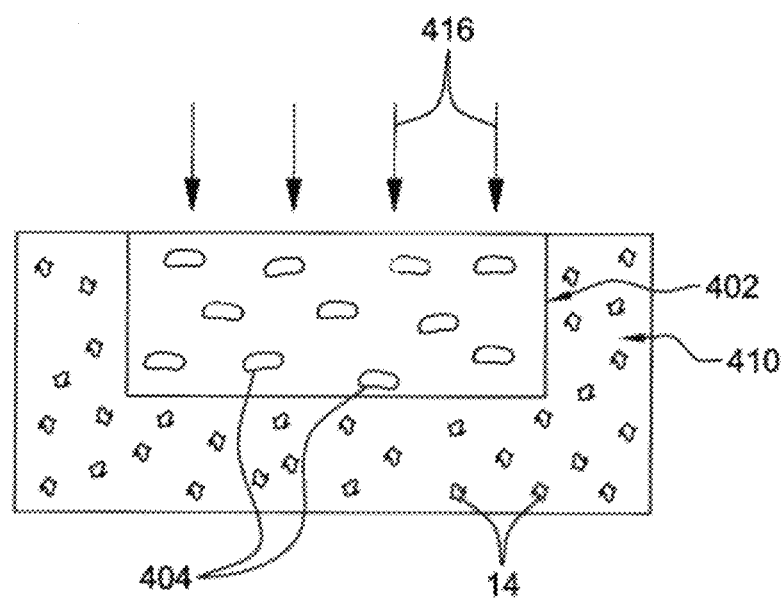
FIG. 36 is a schematic illustration of a system wherein a suspension having an array of nanoparticles is used for production of biomaterials.

In one example, a suspension set forth herein having an array of nanoparticles 14 can be used for production of biomaterials. Referring to FIG. 36 a Petri dish 402 exposed to light rays 416 comprising algae 404 can be disposed above a suspension 410 having an array of nanoparticles 14. In one embodiment, suspension 410 has broad band absorbance qualities. In another embodiment, suspension 410 includes narrow band absorbance qualities. In one embodiment, the narrow band absorbance qualities are tuned according to the specific algae being grown. In one embodiment, algae 404 can be responsive to green light and accordingly nanoparticles of substance are selected for selective absorbance in the narrow band provided by the green wavelength band. It can be useful to provide suspension 410 to be selectively absorptive in a certain narrow band and transmissive to bands having wavelength upshifted or downshifted relative to the certain narrow band. A narrow band e.g., spanning a certain visible color band can have superior performance relative to broad band absorbance (absorptivity) for the reason that in some instances broad band absorbance can lead to growth of unwanted organisms such as parasites other than the target organisms. Regarding suspension 410, suspension 410 can include e.g., a rigid structural body, e.g., Si, having an array of nanoparticles 14, a flexible structural body 302 having an array of nanoparticles 14 or a gel 11 having a nanoparticle network 16 that comprises an array of nanoparticles 14.

Suspensions having nanoparticle arrays as set forth herein have a variety of uses including in photovoltaic (PV) cells and in optofluidic devices. Suspensions having arrays of nanoparticles 14 set forth herein include rigid structural bodies having arrays of nanoparticles 14, flexible structural bodies having arrays of nanoparticles 14 and gels having arrays of nanoparticles 14 included in a network 16 having nanoparticles 14 and micelle chains. Suspensions having arrays nanoparticles set forth herein can have broad band absorbance qualities or narrow band absorbance qualities.

In one example of an optofluidic device, as set forth in connection with FIG. 7 a gel comprising a nanoparticle network 16 can be used in a multipixel display 25. In another embodiment, a gel comprising a nanoparticle network 16 can be used an indicator device wherein a color exhibited by the gel changes depending on an input activator.

In connection with the embodiments of Table II, samples having absorptivity within the visible spectrum were set forth and it was described that the absorptivity outside the visible band can be achieved. For achieving absorptivity in the infrared (IR) band, core shell nanoparticles can be utilized. Core shell nanoparticles are characterized by a metal shell encapsulating a non-metal core. In one embodiment, the shell can be provided by, e.g., silver (Ag), gold (Au) or aluminum (Al) and the core can be provided by silicon dioxide ($SiO_2$). For achieving absorptivity in the ultraviolent (UV) band, aluminum (Al) nanoparticles can be utilized. Aluminum has a resonant plasma frequency in the ultraviolet (UV) band.

Optofluidic indicator devices can be configured so that a certain color being exhibited by the optofluidic device is indicative of an activator being input to the optofluidic device. In one embodiment, the activator input is thermal (a temperature above a breakdown temperature results in deformation of a nanoparticle network 16 as shown in FIG. 5 and a temperature below a threshold results in re-formation of network 16). Accordingly, in one embodiment the exhibiting of a visible color by a gel (the certain color being exhibited in the case a network 16 is formed, a color other than the certain color in the absence of formation of network 16) is indicative of temperature rising above or falling below a breakdown temperature allowing formation of a distributed array of nanoparticles 14.

Optofluidic devices can also be configured so that an activator input is chemical. In one embodiment a gel is configured so that increasing a PH above a breakdown threshold results in breakdown of a network 16 and reducing a PH below a breakdown threshold causes network 16 to re-form (regenerate) resulting a certain visible color being exhibited by the gel. Accordingly, an exhibiting of a particular visible color by an optofluidic device comprising a gel 11 as depicted in FIG. 5 can be indicative of a PH of the gel falling below the breakdown threshold. Alkalines used to increase a PH of a system and acids can decrease a PH. Accordingly, a visible color of a gel 11 of an optofluidic device can be indicative of a chemical present in an environment. For providing an optofluidic device, a gel 11 can be disposed in a vessel, e.g., a capsule having an associated conduit allowing interaction of the gel with a chemical activator.

An indicator device having a suspension comprising an array of nanoparticles 14 can be provided in a form other than a gel. An indicator device can include a structural body that is provided by a rigid, e.g., silicon (Si), or flexible, e.g., polymethylsidoxane (PDMS), or polyvinyl alcohol (PVA) structural body. An activator input to a rigid or flexible structural body can be thermal, chemical, or mechanical. Input of an activation input into a structural body comprising an array of nanoparticles 14 can yield a change in an exhibited color of the structural body.

Optofluidic and other indicator devices can be used in association with an electronic color image sensor system having a color image sensor for sensing an exhibited color, the system activating an indicator responsively to a sensed color.

Table V presents parameters for various samples that can be provided. Composition (in weight fractions) of multiple species (A through F) of plasmonic nanogels are presented. The WLM concentration is 100 mM for all samples. The diameter of spherical NPs (S) is denoted by d while $d_{rod}$ and α represent the diameter and aspect ratio of rod-like NPs (R). Ranges of concentrations are provided in Table V, with an exemplary concentration preceding each concentration range.

TABLE V

| SAMPLE | A (Ag, S) d = 35 nm (ppm) | B (Au, S) d = 30 nm (ppm) | C (Au, S) d = 90 nm (ppm) | D (Au, R) $d_{rod}$ = 25 nm α = 2.3 (ppm) | E (Au, R) $d_{rod}$ = 25 nm α = 3.0 (ppm) | F (Au, R) $d_{rod}$ = 25 nm α = 1.4 (ppm) |
|---|---|---|---|---|---|---|
| I | 26.7 (20.0 to 30.0) | — | — | — | — | 21.3 (15.0 to 25.0) |
| II | 26.7 (20.0 to 30.0) | — | — | — | 21.3 (15.0 to 25.0) | — |
| III | 13.3 (8.0 to 17.0) | — | 21.3 (15.0 to 25.0) | — | — | — |
| IV | 26.7 (20.0 to 30.0) | 21.3 (15.0 to 25.0) | — | — | — | — |
| V | 13.3 (8.0 to 17.0) | 21.3 (15.0 to 25.0) | — | — | — | — |
| VI | 6.7 (4.0 to 9.0) | 6.7 (4.0 to 9.0) | 6.7 (4.0 to 9.0) | 6.7 (4.0 to 9.0) | 6.7 (4.0 to 9.0) | — |
| VII | 3.3 (1.0 to 5.0) | 6.7 (4.0 to 9.0) | 6.7 (4.0 to 9.0) | 3.3 (1.0 to 5.0) | 13.3 (8.0 to 17.0) | — |
| VIII | 6.7 (4.0 to 9.0) | — | 13.3 (8.0 to 17.0) | — | 13.3 (8.0 to 17.0) | — |
| IX | 3.3 (1.0 to 5.0) | 3.3 (1.0 to 5.0) | 13.3 (8.0 to 17.0) | 6.7 (4.0 to 9.0) | 6.7 (4.0 to 9.0) | — |

Table VI presents parameters for various samples that can be provided. Composition (in weight fractions) of multiple species (A through H) of plasmonic nanogels are presented. The core shell species H can include a core comprising silicon dioxide, $SiO_2$ and a metal shell comprising, e.g., Ag, Au, or Al. The WLM concentration is 100 mM for all samples. The diameter of spherical NPs (S) is denoted by d while $d_{rod}$ and α represent the diameter and aspect ratio of rod-like NPs (R). Ranges of concentrations are provided in Table VI, with an exemplary concentration preceding each concentration range. In one embodiment, the upper bound of 100.0 ppm, in any of the various species of any of the various samples is replaced with the upper bound of a saturation condition, which condition can be regarded as a full areal coverage condition in the case the characterized nanoparticle array is disposed in a rigid or flexible structural body. Any of species A-H can be replaced by an alternate species having a diameter other than the diameter given for the species within a range of diameters of in one embodiment 10 nm to 50 nm. Any of the depicted rod-like species D, E, F can be replaced with a rod-like species having an alternative aspect ratio within a range of alternate aspect ratios of one embodiment 0.5 nm to 20.0 nm. In one embodiment spherical species G and H can be replaced by a rod-like species within the noted diameter and aspect ratio ranges for rod-like species.

TABLE VI

| SAMPLE | A (Ag, S) d = 35 nm (ppm) | B (Au, S) d = 30 nm (ppm) | C (Au, S) d = 90 nm (ppm) | D (Au, R) $d_{rod}$ = 25 nm $\alpha$ = 2.3 (ppm) | E (Au, R) $d_{rod}$ = 25 nm $\alpha$ = 3.0 (ppm) | F (Au, R) $d_{rod}$ = 25 nm $\alpha$ = 1.4 (ppm) | G (Al, S) d = 30 nm (ppm) | H (Core Shell) d = 30 nm 10-50 nm (ppm) |
|---|---|---|---|---|---|---|---|---|
| I | 26.7 (1.0 to 100.0) | — | — | — | — | — | 21.3 (1.0 to 100.0) | — |
| II | 26.7 (1.0 to 100.0) | — | — | — | 21.3 (1.0 to 100.0) | — | 5.0 (1.0 to 100.0) | 5.0 (1.0 to 100.0) |
| III | 13.3 (1.0 to 100.0) | — | 21.3 (1.0 to 100.0) | — | — | — | — | — |
| IV | 26.7 (1.0 to 100.0) | 21.3 (1.0 to 100.0) | — | — | — | — | — | — |
| V | 13.3 (1.0 to 100.0) | 21.3 (1.0 to 100.0) | — | — | — | — | — | — |
| VI | 6.7 (1.0 to 100.0) | 6.7 (1.0 to 100.0) | 6.7 (1.0 to 100.0) | 6.7 (1.0 to 100.0) | 6.7 (1.0 to 100.0) | — | — | — |
| VII | 3.3 (1.0 to 100.0) | 6.7 (1.0 to 100.0) | 6.7 (1.0 to 100.0) | 3.3 (1.0 to 100.0) | 13.3 (1.0 to 100.0) | — | 5.0 (1.0 to 100.0) | 5.0 (1.0 to 100.0) |
| VIII | 6.7 (1.0 to 100.0) | — | 13.3 (1.0 to 100.0) | — | 13.3 (1.0 to 100.0) | — | — | — |
| IX | 3.3 (1.0 to 100.0) | 3.3 (1.0 to 100.0) | 13.3 (1.0 to 100.0) | 6.7 (1.0 to 100.0) | 6.7 (1.0 to 100.0) | — | 5.0 (1.0 to 100.0) | 5.0 (1.0 to 100.0) |

A small sample of methods and apparatus set forth herein comprise:

A1. A method comprising: providing a solution comprising surfactant micelles; distributing metal nanoparticles in the solution; agitating the solution to form a gel comprising a nanoparticle network characterized by an array of metal nanoparticles, the metal nanoparticles defining the array being combined with surfactant micelle chains. A2. The method of A1, wherein the method includes transferring the nanoparticle network to a structural body. A3. The method of A2, wherein the transferring includes dipping an external structural body into the gel. A4. The method of A1, wherein the distributing includes selecting one or more of a concentration, size, and shape of the metal nanoparticles. A5. The method of A1, wherein the method includes transferring the nanoparticle network to a structural body provided by a Si/SiO$_2$ wafer. A6. The method of A5, wherein the method further includes disposing electrodes on the wafer to form a solar cell. A7. The method of A1, wherein the method includes transferring the nanoparticle network to a structural body provided by a thin film.

B1. An apparatus comprising: a structural body; a nanoparticle array integrated in the structural body, the nanoparticle array being a distributed nanoparticle array formed in the structural body by transferring a nanoparticle network comprising the array to the structural body, the nanoparticle network characterized by nanoparticles combined with surfactant micelle chains. B2. The apparatus of B1, wherein the structural body is a Si/SiO$_2$ wafer, and wherein the nanoparticle network is integrated in the SiO$_2$ layer of the Si/SiO$_2$ wafer. B3. The apparatus of B1, wherein the structural body comprises glass. B4. The apparatus of B1, wherein the structural body comprises a lens. B5. The apparatus of B1, wherein the structural body comprises an eyeglass lens.

C1. A gel comprising; a fluid; a nanoparticle network disposed in the fluid, the nanoparticle network comprising nanoparticles combined with surfactant micelle chains. C2. The gel of C1, wherein the gel has a viscosity of about ~1 Pa·s. C3. The gel of C1, wherein the gel is configured so that the nanoparticle network breaks down on being subject to heat above a threshold temperature, and regenerates on the removal of heat below a threshold temperature.

D1. A method comprising: providing a solution comprising surfactant micelles; distributing nanoparticles in the solution; agitating the solution to form a gel comprising a nanoparticle network characterized by an array of nanoparticles. D2. The method of claim D1, wherein the agitating includes agitating the solution to form a gel comprising a nanoparticle network characterized by an array of nanoparticles combined with surfactant micelle chains. D3. The method of D1, wherein the method includes transferring the nanoparticle network to a structural body. D4. The method of D3, wherein the transferring includes dipping the structural body into the gel. D5. The method of D1, wherein the distributing includes selecting one or more of a concentration, size, and shape of the nanoparticles. D6. The method of D1, wherein the method includes transferring the nanoparticle network to a structural body provided by an Si S$_1$O$_2$ wafer. D7. The method of D6, wherein the method includes disposing electrodes on the wafer to form a solar cell. D8. The method of D1, wherein the method includes transferring the nanoparticle network to a flexible structural body. D9. The method of D1, wherein the method includes transferring the nanoparticle network to a light transmissive structural body. D10. The method of D1, wherein the method includes transferring the nanoparticle network to a flexible and light transmissive structural body. D11. The method of D1, wherein the method includes transferring the nanoparticle network to a structural body provided by a thin film. D12. The method of claim D1, wherein the distributing includes using nanoparticles comprising first and second different material. D13. The method of claim D1, wherein the distributing includes using core shell nanoparticles. D14. The method of claim D1, wherein the distributing includes using metal nanoparticles selected from the group consisting of silver (Ag) nanoparticles, gold (Au) nanoparticles and aluminum (Al) metal nanoparticles. D15. The method of claim D1, wherein the distributing includes using silver (Ag) nanoparticles, gold (Au) nanoparticles and aluminum (Al) metal nanoparticles. D16. The method of claim D1, wherein the distributing includes using nanoparticles comprising first and second different shapes. D17. The method of claim D1, wherein the distributing includes using spherical nanoparticles of a first material, and rod-like nanoparticles of a second material. D18. The method of claim D1, wherein the method further includes evaporation and removal of surfactant. D19. The method of claim D1, wherein the method includes using first and second species of nanoparticles. D20. The method of claim D1, wherein the method includes using first, second and third species of nanoparticles. D21. The method of claim D1, wherein the method includes using colloid particles to form a double network of entanglements and nanoparticle-mediated junctions. D22. The method of claim D1, wherein the distributing includes distributing a first species of nanoparticles characterized by a first shape, material, diameter and concentration, and wherein the distributing includes distributing a second species of nanoparticles characterized by a second shape, material, diameter, and concentration. D23. The method of claim D1, wherein the distributing includes distributing a first species of nanoparticles characterized by a first shape, material, diameter and concentration and wherein the distributing includes distributing a second species of nanoparticles characterized by a second shape, material, diameter, and concentration, and wherein each of the first species and the second species have concentrations greater than 1.0 ppm. D24. The method of claim D1, wherein the distributing includes distributing a first species of nanoparticles characterized by a rod-like shape of a first aspect ratio and wherein the distributing includes distributing a second species of nanoparticles characterized by a rod-like shape of a second aspect ratio. D25. The method of claim D1, wherein the distributing includes distributing a first species of nanoparticles characterized by a first diameter and concentration and wherein the distributing includes distributing a second species of nanoparticles characterized by a second diameter and concentration, and wherein the distributing includes distributing a third species of nanoparticles characterized by a third diameter and concentration, and wherein each of the first species second and third species have concentrations greater than 1.0 ppm. D25. The method of D1, wherein the method includes transferring the nanoparticle network to a flexible structural body. D26. The method of D1, wherein the method includes transferring the nanoparticle network to a first layer of flexible material, and disposing adjacent to the first layer of flexible layer material a second layer of flexible material the second layer of flexible material being without an array of nanoparticles. D27. The method of claim D1, wherein the distributing includes distributing first species, second species, third species, and fourth species of nanoparticles, the first species being spherical metal nanoparticles of a first diameter, the second species being spherical metal nanoparticles of a second diameter, the third species being rod-like metal nanoparticles of a first aspect ratio, the fourth species being rod-like metal nanoparticles of a second aspect ratio. D28. The method of claim D27, wherein the distributing includes distributing the first, second, third, fourth and fifth species each in concentrations of greater than 1.0 ppm. D29. The method of claim D27, wherein the first, second, third, fourth species are gold (Au) metal nanoparticles. D30. The method of claim D27, wherein the first species are silver (Ag) metal nanoparticles and wherein the second species are gold (Au) metal nanoparticles. D31. The method of claim D27, wherein the method includes distributing fifth species of nanoparticles, the fifth species being spherical nanoparticles of a third diameter. D32. The method of claim D27, wherein the first species has a concentration of between 1.0 and 5.0 ppm, wherein the second species has a concentration of between 4.0 and 9.0 ppm, wherein the third species has a concentration of between about 4.0 and about 9.0 ppm and wherein the third species has a concentration of between 4.0 and 9.0 ppm. D33. The method of claim D27, wherein the first species has a concentration of between 4.0 and 9.0 ppm, wherein the second species has a concentration of between 4.0 and 9.0 ppm, wherein the third species has a concentration of between about 1.0 and about 5.0 ppm and wherein the third species has a concentration of between 8.0 and 17.0 ppm. D34. The method of claim D27, wherein the first species has a concentration of between 1.0 and 5.0 ppm, wherein the second species has a concentration of between 8.0 and 17.0 ppm, wherein the third species has a concentration of between about 4.0 and about 9.0 ppm and wherein the third species has a concentration of between 4.0 and 9.0 ppm.

E1. An apparatus comprising: a structural body; a nanoparticle array integrated in the structural body, the nanoparticle array being a distributed nanoparticle array having first nanoparticles of a first species and second nanoparticles of a second species. E2. The apparatus of claim E1, wherein the first and second species are of different materials. E3. The apparatus of claim E1, wherein the first species is characterized by a first shape and wherein the second species is characterized by a second shape. E4. The apparatus of claim E1, wherein the first species is characterized by a first shape and material wherein the second species is characterized by a second shape and material. E5. The apparatus of claim E1, wherein the first nanoparticles and the second nanoparticles are uniformly integrated in an area of the structural body. E6. The apparatus of claim E1, wherein the structural body is a flexible structural body. E7. The apparatus of claim E1, wherein the structural body is light transmissive, wherein the apparatus is adapted to be disposed proximate a building or vehicle window, and wherein the apparatus is operative to be movable so that an area of coverage of the window by the apparatus is adjustable. E8. The apparatus of claim E1, wherein the structural body is light transmissive, wherein the structural body is a window of a building of building or vehicle. E9. The apparatus of claim E1, wherein the first species is characterized by a first shape, material, and diameter wherein the second species is characterized by a second shape diameter and material. E10. The apparatus of claim E1, wherein the first species is characterized by a first shape, material, diameter and concentration wherein the second species is characterized by a second shape, material, diameter, and concentration. E11. The apparatus of claim E1, wherein the first species is characterized by a first shape, material, diameter and concentration and wherein the second species is characterized by a second shape, material, diameter, and concentration, and wherein each of the first species and the second species have concentrations greater than 1.0 ppm. E12. The apparatus of claim E1, wherein the first species is characterized by a rod-like shape of a first aspect ratio, and the second species is characterized by a rod-like shape of a second aspect ratio. E13. The apparatus of claim E1, wherein the nanoparticles include third nanoparticles of a third species, wherein the first species is characterized by a first diameter and concentration wherein the second species is characterized by a second diameter, and concentration, and wherein the third species is characterized by a third diameter and concentration, and wherein the concentration of each of the first, second and third species is greater than 1.0 ppm. E14. The apparatus of claim E1, wherein the structural body includes electrodes formed therein. E15. The apparatus of E1, wherein the structural body is a Si/SiO$_2$ wafer, and wherein the nanoparticle network is integrated in the SiO$_2$ layer of the Si/SiO$_2$ wafer. E16. The apparatus of E1, wherein the apparatus is a flexible photovoltaic apparatus. E17. The apparatus of E1, wherein the structural body comprises glass. E18. The apparatus of E1, wherein the structural body comprises a lens. E19. The apparatus of E1, wherein the structural body comprises an eyeglass lens. E20. The apparatus of claim E1, wherein the distributed nanoparticle array is uniformly distributed nanoparticle array including first species, second species, third species, and fourth species of nanoparticles, the first species being spherical metal nanoparticles of a first diameter, the second species being spherical metal nanoparticles of a second diameter, the third species being rod-like metal nanoparticles of a first aspect ratio, the fourth species being rod-like metal nanoparticles of a second aspect ratio. E21. The apparatus of claim E20, wherein an area of the structural body includes the first, second, third, and fourth species each in concentrations of greater than 1.0 ppm. E22. The apparatus of claim E20, wherein the first, second, third, and fourth species are gold (Au) metal nanoparticles. E23. The apparatus of claim E20, wherein the first species are silver (Ag) metal nanoparticles and wherein the second species are gold (Au) metal nanoparticles. E24. The apparatus of claim E20, wherein the structural body includes a fifth species of nanoparticles, the fifth species being spherical nanoparticles of a third diameter. E25. The apparatus of claim E20, wherein the first species has a concentration of between 1.0 and 5.0 ppm, wherein the second species has a concentration of between 4.0 and 9.0 ppm, wherein the third species has a concentration of between about 4.0 and about 9.0 ppm and wherein the third species has a concentration of between 4.0 and 9.0 ppm. E26. The apparatus of claim E20, wherein the first species has a concentration of between 4.0 and 9.0 ppm, wherein the second species has a concentration of between 4.0 and 9.0 ppm, wherein the third species has a concentration of between about 1.0 and about 5.0 ppm and wherein the third species has a concentration of between 8.0 and 17.0 ppm. E27. The apparatus of claim E20, wherein the first species has a concentration of between 1.0 and 5.0 ppm, wherein the second species has a concentration of between 8.0 and 17.0 ppm, wherein the third species has a concentration of between about 4.0 and about 9.0 ppm and wherein the third species has a concentration of between 4.0 and 9.0 ppm. E28. The apparatus of claim E1, wherein the first nanoparticles are core shell nanoparticles. E29. The apparatus of claim E1, wherein the nanoparticle array is a uniformly distributed nanoparticle array having first silver (Ag) nanoparticles providing the first species, second gold (Au) nanoparticles providing the second species, aluminum (Al) nanoparticles providing a third species and core shell nanoparticles providing a fourth species.

F1. A method comprising: providing a gel having a nanoparticle network disposed in a fluid, the nanoparticle network comprising nanoparticles combined with surfactant micelle clans; adding heat to the fluid so that the nanoparticle network breaks down; and removing heat from the fluid so that the network is regenerated. F2. The method of claim F1, wherein the method includes providing the gel to include a band gap in absorptivity when the nanoparticle network is in a formed state so that the gel exhibits a color in accordance with the band gap when the nanoparticle network is in a formed state and further so that the gel does not exhibit a color in accordance with the band gap after the nanoparticle network is in an unformed state. F3. The method of claim F1, wherein the method includes using the method to provide a multiple pixel display. F4. The method of claim F1, wherein the method includes using the method in an optofluidic indicator.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than or greater than the mentioned certain number of elements. Also, while a number of particular embodiments have been described, it will be understood that features and aspects that have been described with reference to each particular embodiment can be used with each remaining particularly described embodiment.

The invention claimed is:
1. A method comprising:
providing a solution comprising surfactant micelles, the solution having nanoparticles therein; and
agitating the solution to form a gel comprising a nanoparticle network characterized by a plurality of nanoparticles combined with surfactant micelle chains so that the nanoparticle network maintains a distribution of nanoparticles, wherein nanoparticles of the plurality of nanoparticles include elemental metal.

2. The method of claim 1, wherein the method includes transferring the nanoparticle network to a structural body.

3. The method of claim 1, wherein the method includes transferring the nanoparticle network to a structural body provided by an Si/SiO$_2$ wafer.

4. The method of claim 1, wherein the method includes transferring the nanoparticle network to a flexible structural body.

5. The method of claim 1, wherein the method includes transferring the nanoparticle network to a light transmissive structural body.

6. The method of claim 1, wherein the method includes transferring the nanoparticle network to a flexible and light transmissive structural body.

7. The method of claim 1, wherein the method includes using silver (Ag) nanoparticles, gold (Au) nanoparticles and aluminum (Al) metal nanoparticles.

8. The method of claim 1, wherein the method includes using nanoparticles comprising first and second different shapes.

9. The method of claim 1, wherein nanoparticles of the plurality of nanoparticles include a first species of nanoparticles characterized by a first shape, first material, first diameter and first concentration, and wherein nanoparticles of the plurality of nanoparticles include a second species of nanoparticles characterized by a second shape, second material, second diameter, and second concentration.

10. The method of claim 1, wherein nanoparticles of the plurality of nanoparticles include first species, second species, third species, and fourth species of nanoparticles, the first species being spherical metal nanoparticles of a first diameter, the second species being spherical metal nanoparticles of a second diameter, the third species being rod-like metal nanoparticles of a first aspect ratio, the fourth species being rod-like metal nanoparticles of a second aspect ratio.

11. The method of claim 10, wherein the first species has a concentration of between 1.0 and 5.0 ppm, wherein the second species has a concentration of between 8.0 and 17.0 ppm, wherein the third species has a concentration of between about 4.0 and about 9.0 ppm and wherein the third species has a concentration of between 4.0 and 9.0 ppm.

12. The method of claim 1, wherein nanoparticles of the plurality of nanoparticles include core shell metal nanoparticles.

13. The method of claim 1, wherein the nanoparticles of the plurality of nanoparticles include elemental metal selected from the group consisting of: silver (Ag), gold (Au), aluminum (Al) and copper (Cu).

14. The method of claim 1, wherein first nanoparticles of the plurality of nanoparticles include a first elemental metal, the first elemental metal being an elemental metal selected from the group consisting of: silver (Ag), gold (Au), aluminum (Al) and copper (Cu), wherein second nanoparticles of the plurality of nanoparticles include a second elemental metal, the second elemental metal being an elemental metal selected from the group consisting of: silver (Ag), gold (Au), aluminum (Al) and copper (Cu), the second elemental being different than the first elemental metal.

15. The method of claim 1, wherein first nanoparticles of the plurality of nanoparticles include a first elemental metal, the first elemental metal being an elemental metal selected from the group consisting of: silver (Ag), gold (Au), aluminum (Al) and copper (Cu), wherein second nanoparticles of the plurality of nanoparticles include a second elemental metal, the second elemental metal being an elemental metal selected from the group consisting of: silver (Ag), gold (Au), aluminum (Al) and copper (Cu), wherein third nanoparticles of the plurality of nanoparticles include a third elemental metal, the third elemental metal being an elemental metal selected from the group consisting of: silver (Ag), gold (Au), aluminum (Al) and copper (Cu), wherein the first elemental metal, the second elemental metal and third elemental metal are different elemental metals.

16. A method comprising:
providing a solution comprising surfactant micelles, the solution having nanoparticles therein; and
agitating the solution to form a gel comprising a nanoparticle network characterized by a plurality of nanoparticles, wherein the method includes using silver (Ag) nanoparticles, gold (Au) nanoparticles and aluminum (Al) nanoparticles, wherein the nanoparticle network maintains a distribution of nanoparticles of the plurality of nanoparticles.

17. A method comprising:
providing a solution comprising surfactant micelles, the solution having nanoparticles therein; and
agitating the solution to form a gel comprising a metal nanoparticle network characterized by a plurality of metal nanoparticles, wherein the metal nanoparticle network maintains a distribution of metal nanoparticles of the plurality of metal nanoparticles, and wherein metal nanoparticles of the plurality of the metal nanoparticles include elemental metal.

18. The method of claim 17, wherein metal nanoparticles of the plurality of metal nanoparticles include core shell metal nanoparticles.

19. The method of claim 17, wherein metal nanoparticles of the plurality of metal nanoparticles include elemental metal selected from the group consisting of: silver (Ag), gold (Au), aluminum (Al) and copper (Cu).

20. The method of claim 17, wherein first metal nanoparticles of the plurality of metal nanoparticles include a first elemental metal, the first elemental metal being an elemental metal selected from the group consisting of: silver (Ag), gold (Au), aluminum (Al) and copper (Cu), wherein second metal nanoparticles of the plurality of metal nanoparticles include a second elemental metal, the second elemental metal being an elemental metal selected from the group consisting of: silver (Ag), gold (Au), aluminum (Al) and copper (Cu), the second elemental being different than the first elemental metal.

21. The method of claim 17, wherein first metal nanoparticles of the plurality of metal nanoparticles include a first elemental metal, the first elemental metal being an elemental metal selected from the group consisting of: silver (Ag), gold (Au), aluminum (Al) and copper (Cu), wherein second metal nanoparticles of the plurality of metal nanoparticles include a second elemental metal, the second elemental metal being an elemental metal selected from the group consisting of: silver (Ag), gold (Au), aluminum (Al) and copper (Cu), wherein third metal nanoparticles of the plurality of metal nanoparticles include a third elemental metal, the third elemental metal being an elemental metal selected from the group consisting of: silver (Ag), gold (Au), aluminum (Al) and copper (Cu), wherein the first elemental metal, the second elemental metal and third elemental metal are different elemental metals.

22. The method of claim 1, wherein the method includes applying heat to break down the nanoparticle network.

23. The method of claim 1, wherein the method includes transferring the nanoparticle network to a structural body provided by a wafer.

24. A method comprising:
providing a solution comprising surfactant micelles, the solution having nanoparticles therein; and
agitating the solution to form a gel comprising a nanoparticle network characterized by a plurality of nanoparticles combined with surfactant micelle chains so that the nanoparticle network maintains a distribution of nanoparticles, wherein nanoparticles of the plurality of nanoparticles include metal and wherein the method includes transferring the nanoparticle network to a structural body.

25. The method of claim 24, wherein the structural body includes a wafer.

26. The method of claim 24, wherein the structural body includes a flexible structural body.

27. The method of claim 24, wherein the structural body includes a light transmissive structural body.

28. The method of claim 24, wherein nanoparticles of the plurality of nanoparticles include core shell metal nanoparticles.

29. The method of claim 24, wherein nanoparticles of the plurality of nanoparticles include elemental metal selected from the group consisting of: silver (Ag), gold (Au), aluminum (Al) and copper (Cu).

30. The method of claim 24, wherein first nanoparticles of the plurality of nanoparticles include a first elemental metal, the first elemental metal being an elemental metal selected from the group consisting of: silver (Ag), gold (Au), aluminum (Al) and copper (Cu), wherein second nanoparticles of the plurality of nanoparticles include a second elemental metal, the second elemental metal being an elemental metal selected from the group consisting of: silver (Ag), gold (Au), aluminum (Al) and copper (Cu), the second elemental being different than the first elemental metal.

31. The method of claim 24, wherein first nanoparticles of the plurality of nanoparticles include a first elemental metal, the first elemental metal being an elemental metal selected from the group consisting of: silver (Ag), gold (Au), aluminum (Al) and copper (Cu), wherein second nanoparticles of the plurality of nanoparticles include a second elemental metal, the second elemental metal being an elemental metal selected from the group consisting of: silver (Ag), gold (Au), aluminum (Al) and copper (Cu), wherein third nanoparticles of the plurality of nanoparticles include a third elemental metal, the third elemental metal being an elemental metal selected from the group consisting of: silver (Ag), gold (Au), aluminum (Al) and copper (Cu), wherein the first elemental metal, the second elemental metal and third elemental metal are different elemental metals.

32. A method comprising:
providing a solution comprising surfactant micelles, the solution having nanoparticles therein; and
agitating the solution to form a gel comprising a nanoparticle network characterized by a plurality of nanoparticles combined with surfactant micelle chains so that the nanoparticle network maintains a distribution of nanoparticles, wherein nanoparticles of the plurality of nanoparticles include metal and wherein the method includes using nanoparticles comprising first and second different shapes.

* * * * *